US009788652B2

(12) United States Patent
Greer

(10) Patent No.: US 9,788,652 B2
(45) Date of Patent: Oct. 17, 2017

(54) PAN SUPPORT APPARATUS

(71) Applicant: Duke Manufacturing Co., St. Louis, MO (US)

(72) Inventor: Franklin D. Greer, Sedalia, MO (US)

(73) Assignee: Duke Manufacturing Co., St. Louis, MO (US)

( * ) Notice: Subject to any disclaimer, the term of this patent is extended or adjusted under 35 U.S.C. 154(b) by 0 days.

(21) Appl. No.: 14/822,215

(22) Filed: Aug. 10, 2015

(65) Prior Publication Data
US 2016/0037918 A1 Feb. 11, 2016

Related U.S. Application Data

(60) Provisional application No. 62/035,264, filed on Aug. 8, 2014.

(51) Int. Cl.
*A47B 88/00* (2017.01)
*A47B 77/02* (2006.01)
*A47B 31/00* (2006.01)
*A47B 57/08* (2006.01)
*A47B 75/00* (2006.01)
*A47J 39/00* (2006.01)

(52) U.S. Cl.
CPC .............. *A47B 77/02* (2013.01); *A47B 31/00* (2013.01); *A47B 57/08* (2013.01); *A47B 75/00* (2013.01); *A47J 39/006* (2013.01); *A47B 2031/003* (2013.01)

(58) Field of Classification Search
CPC ........ A47B 88/0407; A47B 2088/0448; F25D 23/021; F25D 25/025
USPC ......... 312/402, 404, 270.1, 319.1, 291, 301, 312/270.3
See application file for complete search history.

(56) References Cited

U.S. PATENT DOCUMENTS 309,192 A * 12/1884 Brothers ................ A47B 55/00
312/270.1
688,010 A * 12/1901 Simmons ............... A47B 88/00
126/268

(Continued)

FOREIGN PATENT DOCUMENTS

CA 700459 A 12/1964
EP 2666396 * 11/2013

(Continued)

OTHER PUBLICATIONS

International Search Report dated Nov. 27, 2015 in related PCT/IB2015/056088, 6 pages.

(Continued)

*Primary Examiner* — Janet M Wilkens
(74) *Attorney, Agent, or Firm* — Senniger Powers LLP

(57) ABSTRACT

Pan support apparatus, systems, and methods. A pan support system includes a pan support having a pan storage space sized for receiving at least a portion of a pan. The pan support includes at least one slide surface for slidably receiving and supporting the pan in the pan storage space. A cover for covering an open top of the pan is selectively receivable in and removable from the pan storage space. A retainer retains the cover in the pan storage space. A pan storage module including a pan support is releasably mountable at a plurality of elevations on a frame.

25 Claims, 32 Drawing Sheets

(56) References Cited

U.S. PATENT DOCUMENTS

| | | | | |
|---|---|---|---|---|
| 740,677 | A | * | 10/1903 | Monsen et al. ........ A47B 88/00 312/270.3 |
| 1,496,099 | A | * | 6/1924 | O'Connor .......... E05B 63/0065 292/300 |
| 1,820,070 | A | * | 8/1931 | Hippee ................... F25C 1/24 62/329 |
| 2,415,825 | A | * | 2/1947 | Knuth ................... A47B 57/20 108/147.16 |
| 2,517,725 | A | * | 8/1950 | Schweller ............ F25D 25/021 211/153 |
| 2,763,526 | A | * | 9/1956 | Falek ................ A47B 88/0003 312/270.3 |
| 2,813,653 | A | * | 11/1957 | Grossman ............. B65D 25/22 220/345.2 |
| 2,816,809 | A | * | 12/1957 | Miller ..................... B60N 3/08 312/270.1 |
| 3,266,858 | A | * | 8/1966 | Klotz ................... F25D 25/021 312/270.3 |
| 3,295,904 | A | * | 1/1967 | Cobb ................ A47B 88/0407 312/270.3 |
| 3,528,718 | A | * | 9/1970 | Braun ................... A47B 77/18 312/270.3 |
| 3,866,993 | A | * | 2/1975 | Dean .................... E05B 65/463 312/216 |
| 3,870,387 | A | * | 3/1975 | Mortashed ........... E05B 65/463 312/218 |
| 3,874,552 | A | * | 4/1975 | Grimm ................ F25D 25/025 312/270.3 |
| D308,497 | S | | 6/1990 | Roche |
| D320,327 | S | | 10/1991 | Hollins |
| D326,795 | S | | 6/1992 | Reitz |
| 5,251,975 | A | * | 10/1993 | Braun ................... B65F 1/1436 312/334.16 |
| D347,360 | S | | 5/1994 | Wheeler |
| 5,470,143 | A | * | 11/1995 | Gill ..................... A47B 88/044 292/18 |
| 5,607,213 | A | * | 3/1997 | Slivon ..................... A47B 46/00 312/291 |
| 5,828,547 | A | * | 10/1998 | Francovich ............ G06F 1/184 361/679.39 |
| D526,157 | S | | 8/2006 | Laib |
| D538,588 | S | | 3/2007 | Laib et al. |
| D581,205 | S | | 11/2008 | Simon et al. |
| D584,612 | S | | 1/2009 | Ianello |
| D586,623 | S | | 2/2009 | Dunn |
| 7,661,553 | B2 | * | 2/2010 | Zeiron ................. A47K 10/427 221/305 |
| D613,113 | S | | 4/2010 | Lippert |
| D619,829 | S | | 7/2010 | Zalewski |
| D620,765 | S | | 8/2010 | Sudia |
| D620,766 | S | | 8/2010 | Sudia |
| D620,942 | S | | 8/2010 | Huang |
| D664,149 | S | | 7/2012 | Crisp et al. |
| D704,511 | S | | 5/2014 | Beckman |
| D718,086 | S | | 11/2014 | Lewis |
| D719,956 | S | | 12/2014 | Akana |
| D728,991 | S | | 5/2015 | Hasegawa |
| 2004/0217116 | A1 | | 11/2004 | Offerman et al. |
| 2005/0088069 | A1 | * | 4/2005 | Greenwald ............ A47B 88/08 312/333 |
| 2007/0035920 | A1 | * | 2/2007 | Peng ................... G11B 33/124 361/679.31 |
| 2008/0007147 | A1 | * | 1/2008 | Skog ..................... A47B 77/18 312/270.3 |
| 2009/0199725 | A1 | | 8/2009 | Veltrop et al. |
| 2009/0266244 | A1 | | 10/2009 | Maciejewski et al. |
| 2013/0278124 | A1 | * | 10/2013 | Hu ....................... A47B 96/025 312/333 |
| 2013/0300276 | A1 | * | 11/2013 | Nuss ................... F25D 25/021 312/404 |
| 2015/0102717 | A1 | * | 4/2015 | Furr ..................... F25D 25/025 312/404 |
| 2015/0253065 | A1 | * | 9/2015 | Min ....................... B65D 25/22 312/404 |

FOREIGN PATENT DOCUMENTS

| | | |
|---|---|---|
| GB | 616570 A | 1/1949 |
| WO | 00/57709 A1 | 10/2000 |
| WO | 2007/047597 A2 | 4/2007 |

OTHER PUBLICATIONS

Written Opinion dated Nov. 27, 2015 in related PCT/IB2015/056088, 5 pages.

\* cited by examiner

PAN SUPPORT APPARATUS

CROSS-REFERENCE TO RELATED APPLICATION

This application claims priority to U.S. Provisional Patent Application No. 62/035,264, filed Aug. 8, 2014, which is hereby incorporated by reference in its entirety.

FIELD

The present invention generally relates to pan storage and, more particularly, to apparatus and methods for supporting and covering open top pans.

BACKGROUND

Many types of containers have an open top and a lid for closing the open top for storing items therein. For example, some containers having an open top and lid may be used for storing food. It may be desirable to store food in such a container before preparing, serving, and/or consuming the food.

SUMMARY

One aspect of the present invention is directed to a pan support system for supporting at least one open top pan having a rim adjacent the open top. The system includes at least one pan storage module and a frame. The pan storage module includes a pan support having left and right sides, a pan storage space between the left and right sides sized for receiving at least a portion of the pan, and a front opening sized to permit the at least one pan to be inserted in the pan storage space from the front opening. The pan support includes left and right slide surfaces constructed for slidably receiving and supporting respective left and right rim portions of the pan in the pan storage space. The pan support is free of support structure positioned to engage a bottom of the pan for supporting the bottom of the pan in the pan storage space. The module includes a cover for covering the open top of the pan. The cover has a front end, a rear end, and left and right sides. The cover has a pan covering section sized and shaped for covering the open top of the pan and having a pan rim engagement surface constructed to engage the pan around substantially an entire periphery of the pan rim. The cover is selectively receivable in and removable from the pan storage space. The cover is constructed to permit the pan to be slidably received under the cover in the pan storage space. At least one retainer is provided for retaining the cover in the pan storage space. The at least one retainer is constructed to permit the pan to be slidably received on the left and right slide surfaces in the pan storage space from the front opening below the retainer. The cover includes at least one retainer engagement surface constructed to engage the at least one retainer to retain the cover in the pan storage space when the cover is in the pan storage space with the pan. The module includes at least two first mounting elements for selectively forming respective releasable mounting connections. The at least two first mounting elements include a first mounting element on the left side of the pan support and a first mounting element on the right side of the pan support. The frame includes a plurality of second mounting elements for selectively forming the releasable mounting connections with the at least two first mounting elements of the pan storage module. The plurality of second mounting elements include multiple sets of at least two second mounting elements. The sets of at least two second mounting elements are positioned at different elevations on the frame. The at least two first mounting elements of the pan storage module are selectively engageable with a selected set of the second mounting elements of the frame for forming respective releasable mounting connections for mounting the pan storage module at a selected elevation on the frame.

Another aspect of the present invention is directed to a pan support system for supporting at least one open top pan having a rim adjacent the open top. The system includes a pan support having left and right sides, a pan storage space between the left and right sides sized for receiving at least a portion of the pan, and a front opening sized to permit the at least one pan to be inserted in the pan storage space from the front opening. The pan support includes left and right slide surfaces constructed for slidably receiving and supporting respective left and right rim portions of the pan in the pan storage space. The pan support is free of support structure positioned to engage a bottom of the pan for supporting the bottom of the pan in the pan storage space. The system includes a cover for covering the open top of the pan. The cover has a front end, a rear end, and left and right sides. The cover is selectively receivable in and removable from the pan storage space from the front opening. The cover is constructed to permit the pan to be slidably received under the cover in the pan storage space. The pan support includes at least one retainer constructed for retaining the cover in the pan storage space. The cover includes at least one retainer engagement surface constructed to engage the at least one retainer to retain the cover in the pan storage space when the cover is in the pan storage space with the pan.

Another aspect of the present invention is directed to an apparatus for supporting an open top pan. The apparatus includes a pan support having left and right sides, a pan storage space between the left and right sides sized to receive at least a portion of the pan, and a front opening sized to permit the pan to be inserted in the pan storage space from the front opening. The pan support includes at least one slide surface in the pan storage space constructed to slidably receive and support the pan on the at least one slide surface. The apparatus includes a cover for covering the open top of the pan. The cover has a front end, a rear end, and left and right sides. The cover is selectively receivable in and removable from the pan storage space from the front opening. The cover is constructed to permit the pan to be slidably received under the cover in the pan storage space. The pan support includes at least one retainer for retaining the cover in the pan storage space. The retainer is constructed to permit the pan to be slidably received on the at least one slide surface in the pan storage space from the front opening below the retainer. The cover includes at least one retainer engagement surface constructed to be in retaining registration with the at least one retainer to retain the cover in the pan storage space when the cover is in the pan storage space with the pan. The pan support is constructed to permit the at least one retainer engagement surface to fall downward out of retaining registration with the at least one retainer without the at least one retainer being moved when the pan is removed from the pan storage space to permit removal of the cover from the pan storage space through the front opening.

Yet another aspect of the present invention is directed to a modular pan support system for supporting at least one open top pan. The support system includes at least one pan storage module including a pan support having left and right sides, a pan storage space between the left and right sides sized for receiving at least a portion of the pan, and a front opening sized to permit the at least one pan to be inserted in the pan storage space from the front opening. The pan support includes at least one slide surface in the pan storage space constructed to slidably receive and support the pan on the at least one slide surface. The pan storage module includes a cover for covering the open top of the pan. The cover has a front end, a rear end, and left and right sides. The cover is selectively receivable in and removable from the pan storage space from the front opening. The cover is constructed to permit the pan to be slidably received under the cover in the pan storage space. The pan storage module includes at least one retainer for retaining the cover in the pan storage space when the cover is in the pan storage space with the pan. The at least one retainer is constructed to permit the pan to be slidably received on the at least one slide surface in the pan storage space from the front opening below the at least one retainer. The pan storage module includes at least two first mounting elements for selectively forming respective releasable mounting connections. The system includes a frame including a plurality of second mounting elements for selectively forming the releasable mounting connections with the at least two first mounting elements of the pan storage module. The plurality of second mounting elements include multiple sets of at least two second mounting elements. The sets of at least two second mounting elements are positioned at different elevations on the frame. The at least two first mounting elements of the pan storage module are selectively engageable with a selected set of the second mounting elements of the frame for forming respective releasable mounting connections for mounting the pan storage module at a selected elevation on the frame.

Other objects and features of the present invention will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
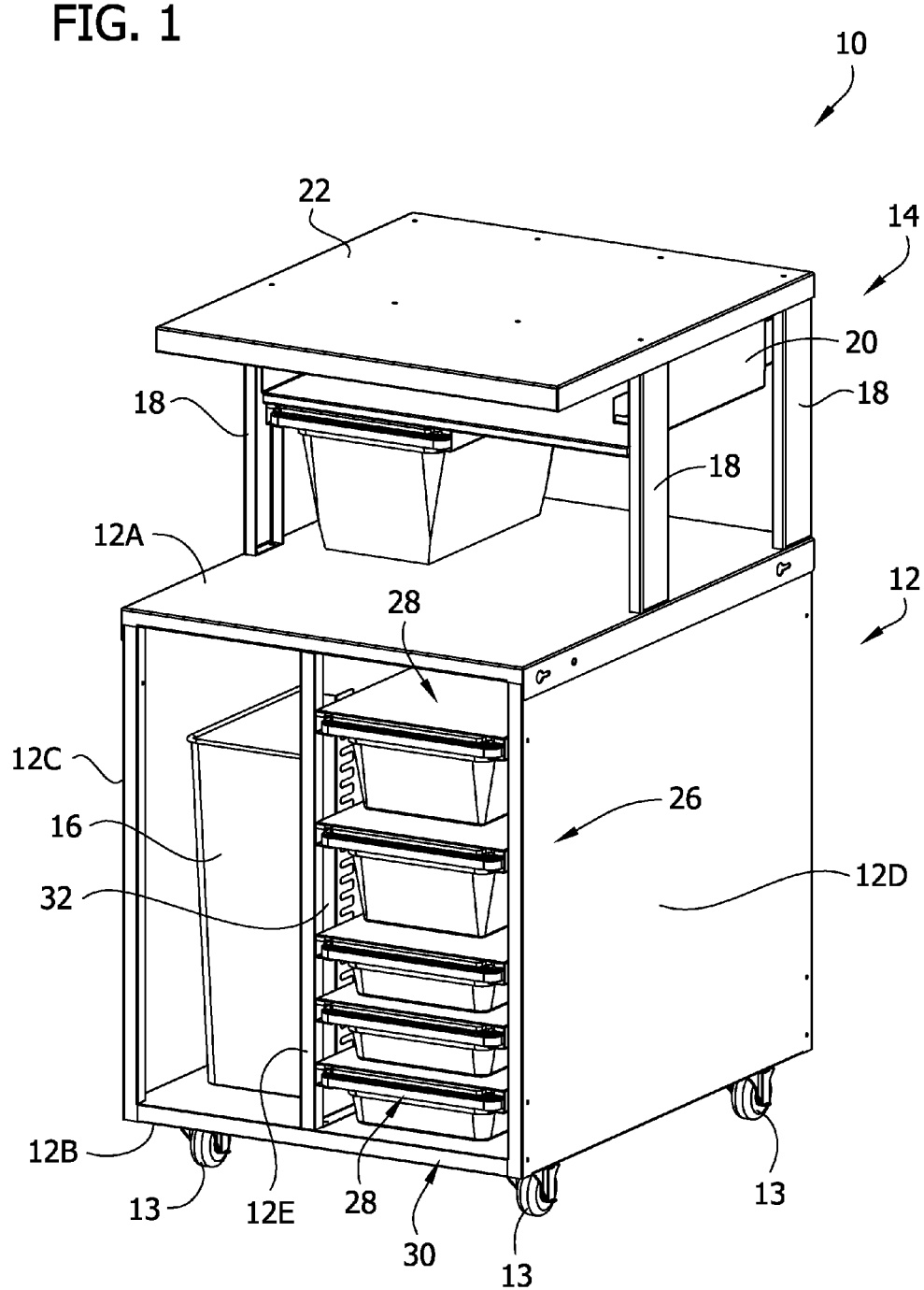
FIG. 1 is a front perspective of a pan storage unit embodying aspects of the present invention.

Referring to the drawings, FIG. 1 illustrates one embodiment of a pan storage unit of the present invention, generally designated by the reference number 10. For example without limitation, the pan storage unit 10 may be used in the food service industry as a food storage and preparation station for storing and preparing food, such as bread products including toast, bagels, pastries, etc., before serving them to customers. However, it will be understood the pan storage unit 10 may be used for other purposes without departing from the scope of the present invention.

In the illustrated embodiment, the pan storage unit 10 comprises a cart including a lower housing 12 or cabinet supported on casters 13 and an upper storage/preparation area 14 above the housing. The housing 12 includes top, bottom, left, and right walls 12A-12D, defining an interior therein, and a partition 12E extending vertically between the top and bottom walls 12A, 12B dividing the interior into left and right compartments. The housing 12 has an open front and open back. In the illustrated embodiment, the left compartment is used for housing a waste basket 16, and the right compartment is used for storing a plurality of pans, as will be described in further detail below. The upper storage/preparation area 14 includes a plurality of uprights 18 supporting a storage compartment 20 and an upper shelf 22 above the storage compartment. A space between the bottom of the storage compartment 20 and the top wall 12A of the cabinet 12 may be used for additional pan storage. Other configurations and arrangements may be used without departing from the scope of the present invention.

Figure 2:
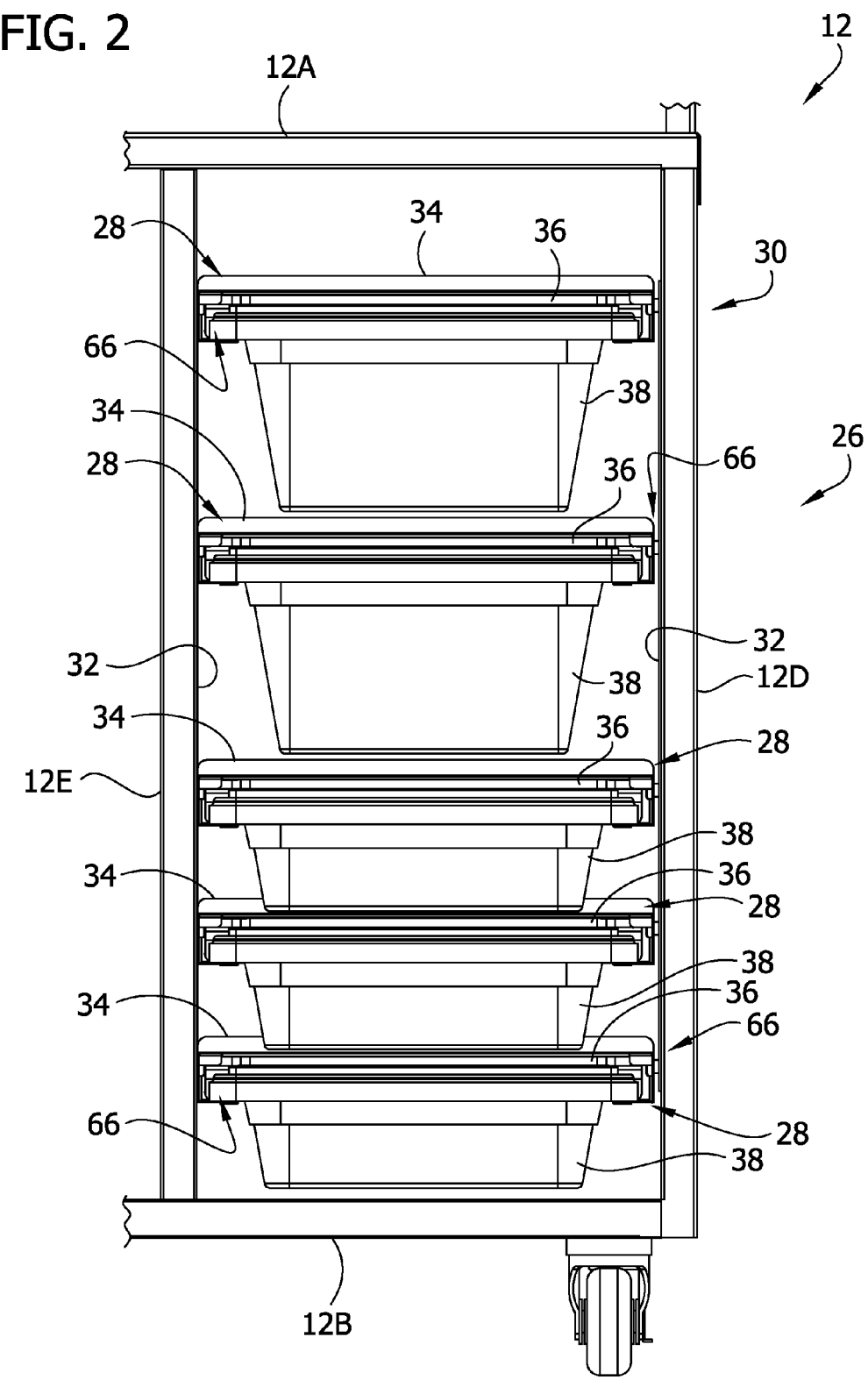
FIG. 2 is a front elevation of a portion of the pan storage unit.
Figure 16:
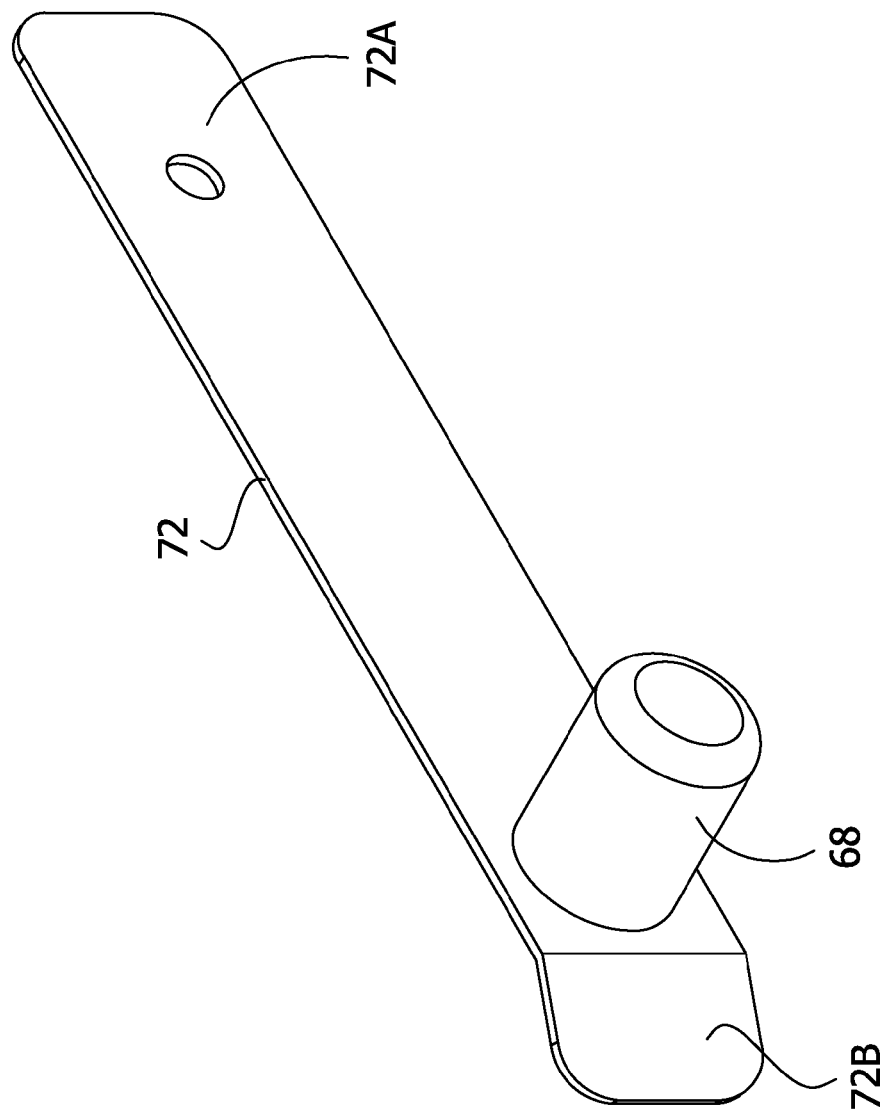
FIG. 16 is a perspective of an element of a mounting element of the pan storage module for forming a releasable mounting connection with the frame.

Referring to FIG. 2, in which the right compartment of the cabinet 12 is shown in closer detail, the pan storage unit 10 includes a modular pan support system, generally indicated by the reference number 26, including a plurality of pan storage modules 28 and a frame 30 on which the pan storage modules are selectively mountable in various positions. In the illustrated embodiment, the frame 30 includes the partition 12E (broadly "left side wall" of the frame), the right side wall 12D, and right sections of the top and bottom walls 12A, 12B of the cabinet 12 forming the right compartment of the cabinet. The frame 30 also includes racks 32 mounted inside the partition 12E and right side wall 12D (e.g., see FIG. 16) for releasably mounting the pan storage modules 28 on the frame, which will be described in further detail below. As will become apparent, contents stored in a pan of the modular pan support system 26 can be accessed by pulling the pan forward from a stowed position to expose an open top of the pan and its contents therein, while the pan remains at least partially supported by the pan support system, and the pan with remaining contents can then be pushed rearward to return the pan to its stowed position, or the pan can be removed from the pan support system (e.g., for emptying and/or cleaning).

Figure 3:
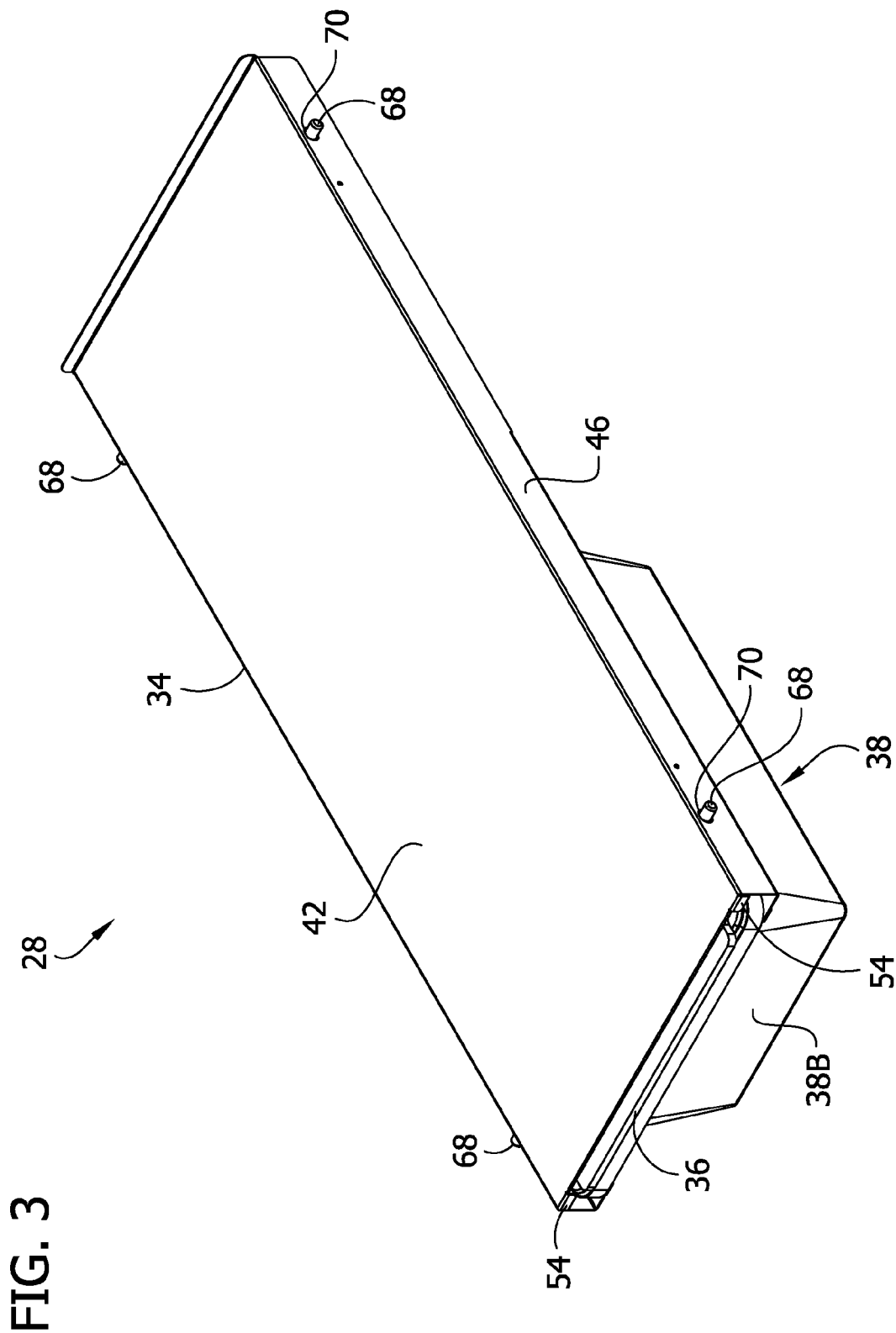
FIG. 3 is a front perspective of a pan storage module and a pan of the pan storage unit.

Referring to FIG. 3, a pan storage module 28 is shown removed from the frame 30. The pan storage module 28 includes a pan support 34 and a cover 36 for supporting and covering a pan 38. The pan 38 and cover 36 are removably receivable in the pan support 34. Accordingly, the pan 38 and cover 36 can be selectively placed in and removed from the pan support 34.

Figure 4:
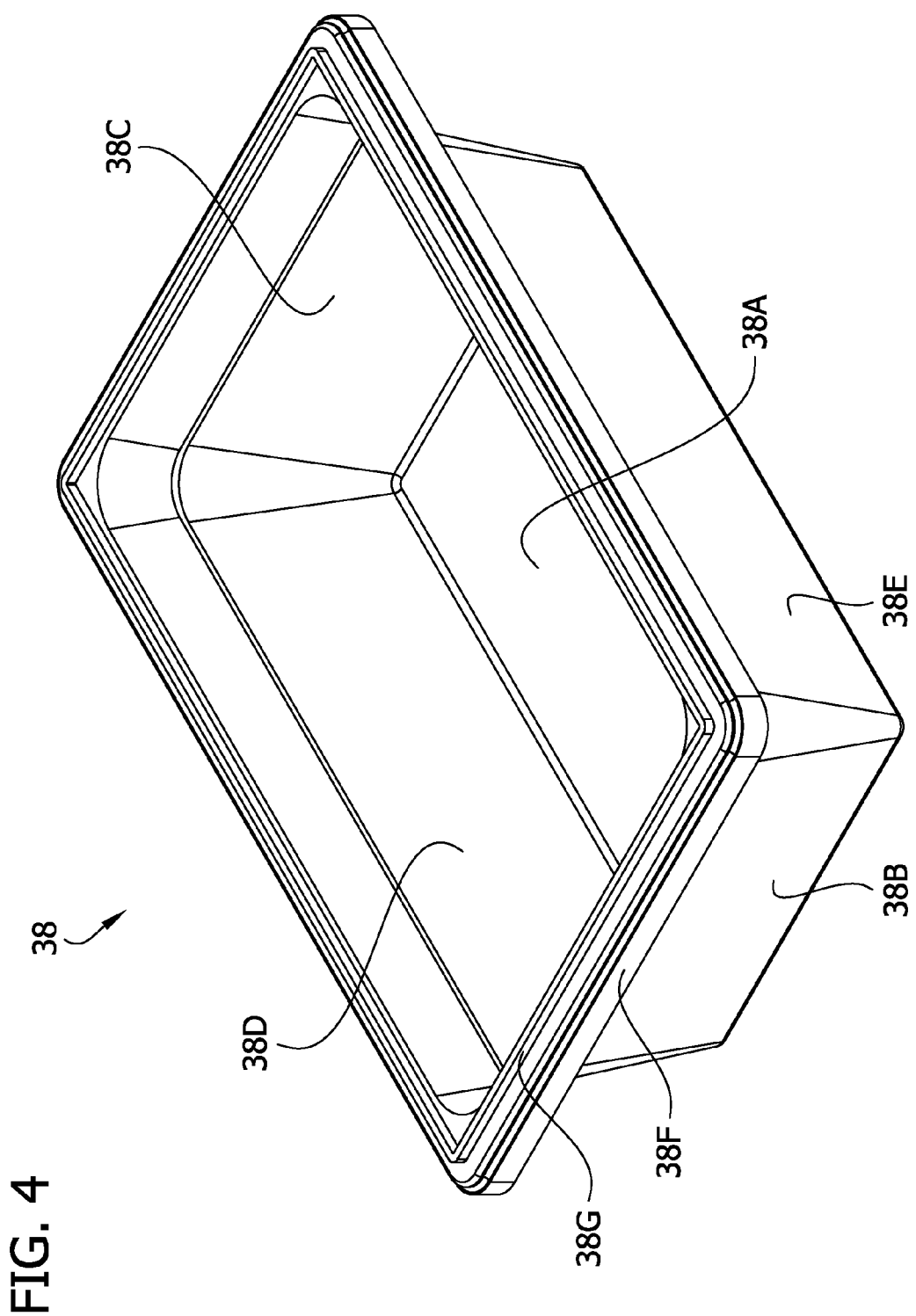
FIG. 4 is a front perspective of a pan for use with the pan storage module.

As shown in FIG. 4, the pan (e.g., "food pan") 38 is generally rectangular and includes a bottom wall 38A, front wall 38B, rear wall 38C, left and right side walls 38D, 38E, defining an interior of the pan, and an open top providing access to the interior. The pan 38 includes a rim 38F extending around the periphery of the pan adjacent the open top. The rim 38F extends outboard of the front, rear, and left and right side walls 38B-38E and includes front, rear, left, and right rim portions corresponding to the respective sides of the pan 38. The rim 38F includes a raised rib 38G extending around the periphery of the rim providing the rim with increased height. Other types of pans and pans having other configurations may be used without departing from the scope of the present invention. For example, the rim may extend around only part of the periphery of the pan (e.g., only the left and right sides), the rim may not be positioned at the top opening, and the raised rib may be omitted, without departing from the scope of the present invention.

Figure 5:
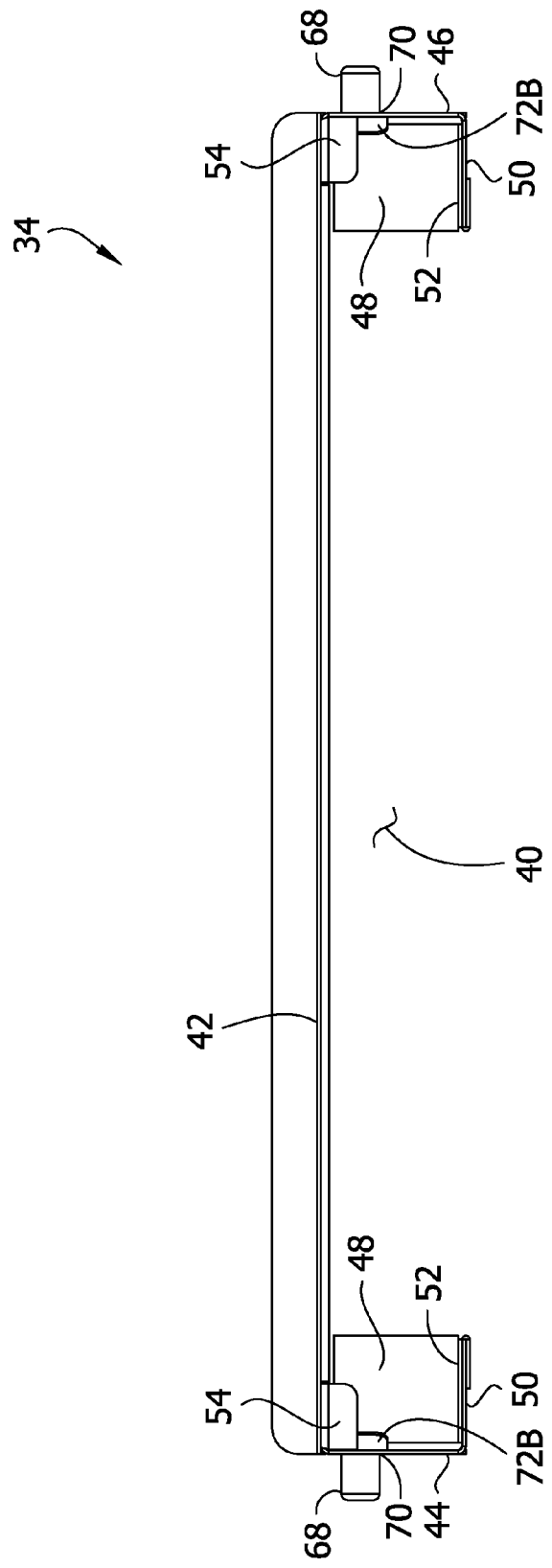
FIG. 5 is a front elevation of a pan support of the pan storage module.
Figure 6:
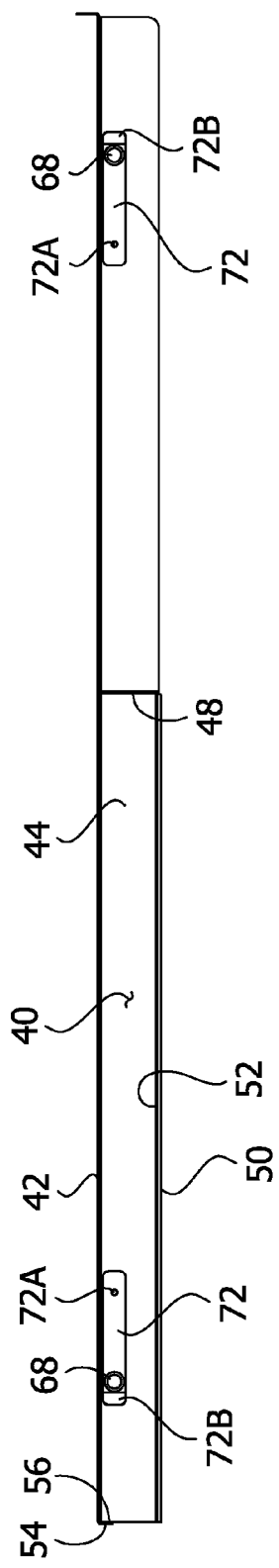
FIG. 6 is a section of the pan support taken along the length of the pan support.

The pan support 34 is shown in closer detail in FIG. 5, which illustrates a front elevation of the pan support, and in FIG. 6, which illustrates a section of the pan support taken along the length of the pan support. In the illustrated embodiment, the pan support 34 is formed of metal, but other suitable materials may be used. The pan support 34 includes a pan storage space 40 bounded by a top wall 42 forming a shelf above the pan storage space, and left and right side walls 44, 46 extending down from the top wall on left and right sides of the pan support. Left and right stops 48 are positioned at the rear end of the pan storage space 40 for preventing the pan 38 and cover 36 from exiting the rear of the pan storage space. For example, as will become apparent, the stops 48 may maintain the cover 36 in position in the pan storage space 40 as the pan is slid into the pan storage space below the cover 36. In the illustrated embodiment, the side walls 44, 46 and the top wall 42 extend rearwardly beyond the rear end of the pan storage space 40. The pan support 34 includes a front opening between the left and right sides of the pan support sized to permit the pan 38 to be received in the pan storage space 40 from the front opening (e.g., at least an upper portion of the pan including the rim 38F).

The pan support 34 includes rails 50 protruding inwardly into the pan storage space 40 from the side walls 44, 46. The rails 50 include respective upwardly facing slide surfaces 52 extending rearwardly from adjacent the front opening toward the rear of the pan storage space 40. The slide surfaces 52 are constructed and positioned to slidably receive and support the pan 38 on the slide surfaces in the pan storage space 40. More specifically, the slide surfaces 52 slidably receive and support the left and right portions of the rim 38F. In the illustrated embodiment, the slide surfaces 52 have front ends terminating at the front opening of the pan storage space 40 and rear ends terminating at the rear end of the pan storage space, and the slide surfaces extend continuously therebetween. Other configurations of slide surfaces may be used without departing from the scope of the present invention. For example, the slide surfaces may be discontinuous or shorter or longer than illustrated, and a slide surface may be positioned for slidably receiving and supporting the bottom 38A of the pan 38 rather than the rim 38F.

It will be appreciated that in the illustrated embodiment the pan storage module 28 and in particular the pan support 34 is free of support structure positioned to engage the bottom 38A of the pan 38 for supporting the bottom of the pan in the pan storage space 40. The pan support 34 is constructed so the pan "hangs" or is suspended by the engagement of the rim 38F with the pan support slide surfaces 52. However, support structure for engaging and supporting the bottom 38A of the pan 38 may be used without departing from the scope of the present invention.

The pan support 34 includes left and right retainers 54 blocking respective upper left and upper right portions of the front opening for retaining the cover 36 in the pan storage space 40 when the pan 38 is received therein, as will become apparent. The retainers 54 include rearward facing cover engagement surfaces 56 for engaging the cover 36 to retain the cover inside the pan storage space 40 when the pan is received therein under the cover. In the illustrated embodiment, the retainers 54 comprise tabs at the front opening of the of the pan storage space 40 that extend downwardly from the top wall 42 adjacent the left and right side walls 44, 46. The tabs 54 block an upper portion of the front opening on respective left and right sides of the front opening. The front opening includes an upper section between the left and right retainers unblocked by the retainers and a lower section below the retainers unblocked by the retainers, and the upper unblocked section has a width less than a width of the lower unblocked section. The retainers 54 are constructed to permit the cover 36 to be slidably received on the slide surfaces 52 from the front opening below the retainers and slid into the pan storage space 40 along the slide surfaces without requiring movement of the retainers. The retainers 54 are also constructed to permit the pan 38 to be slidably received on the slide surfaces 52 from the front opening below the retainers and cover 36 and to be slid into the pan storage space 40 along the slide surfaces into position under the cover without requiring movement of the retainers. The retainers 54 and in particular the cover engagement surfaces 56 are fixed in position on the pan support 34. Other configurations and types of retainers may be used without departing from the scope of the present invention. For example, one, three, or more retainers may be used, the retainers may have positions other than illustrated, the retainers may be formed separately from other parts of the pan support, and the retainers may be movable, without departing from the scope of the present invention.

Pan supports having other configurations may be used without departing from the scope of the present invention. For example, the top wall 42 or shelf could be omitted. Moreover, left and right sides of the pan support (e.g., the left and right side walls 44, 46, and/or the left and right slide surfaces 52) may be separate pieces movable with respect to each other without departing from the scope of the present invention. In such a case, the left and right sides could be mountable with respect to each other for forming the pan support having the front opening.

Figure 7:
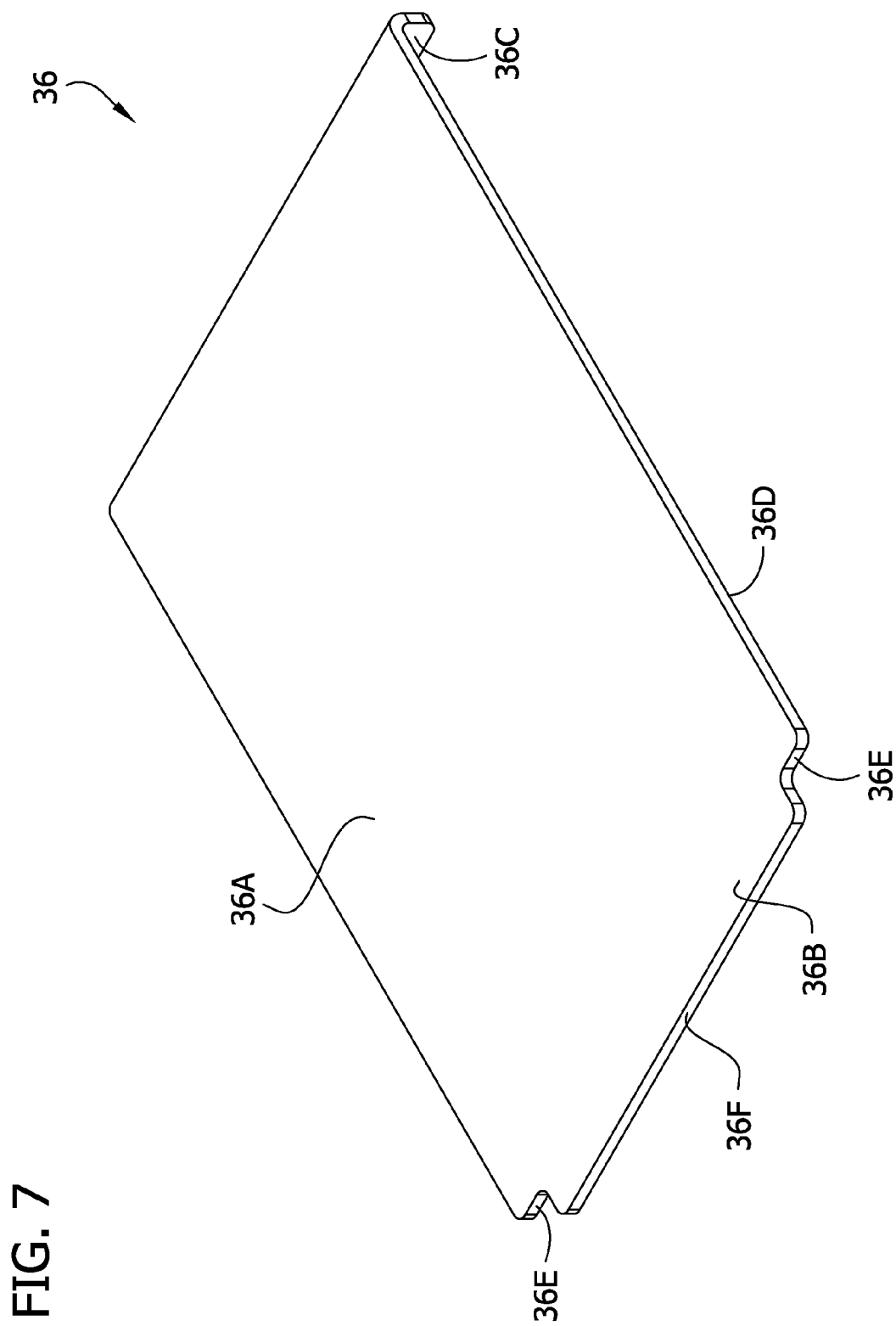
FIG. 7 is a front perspective of a cover of the pan storage module.
Figure 8:
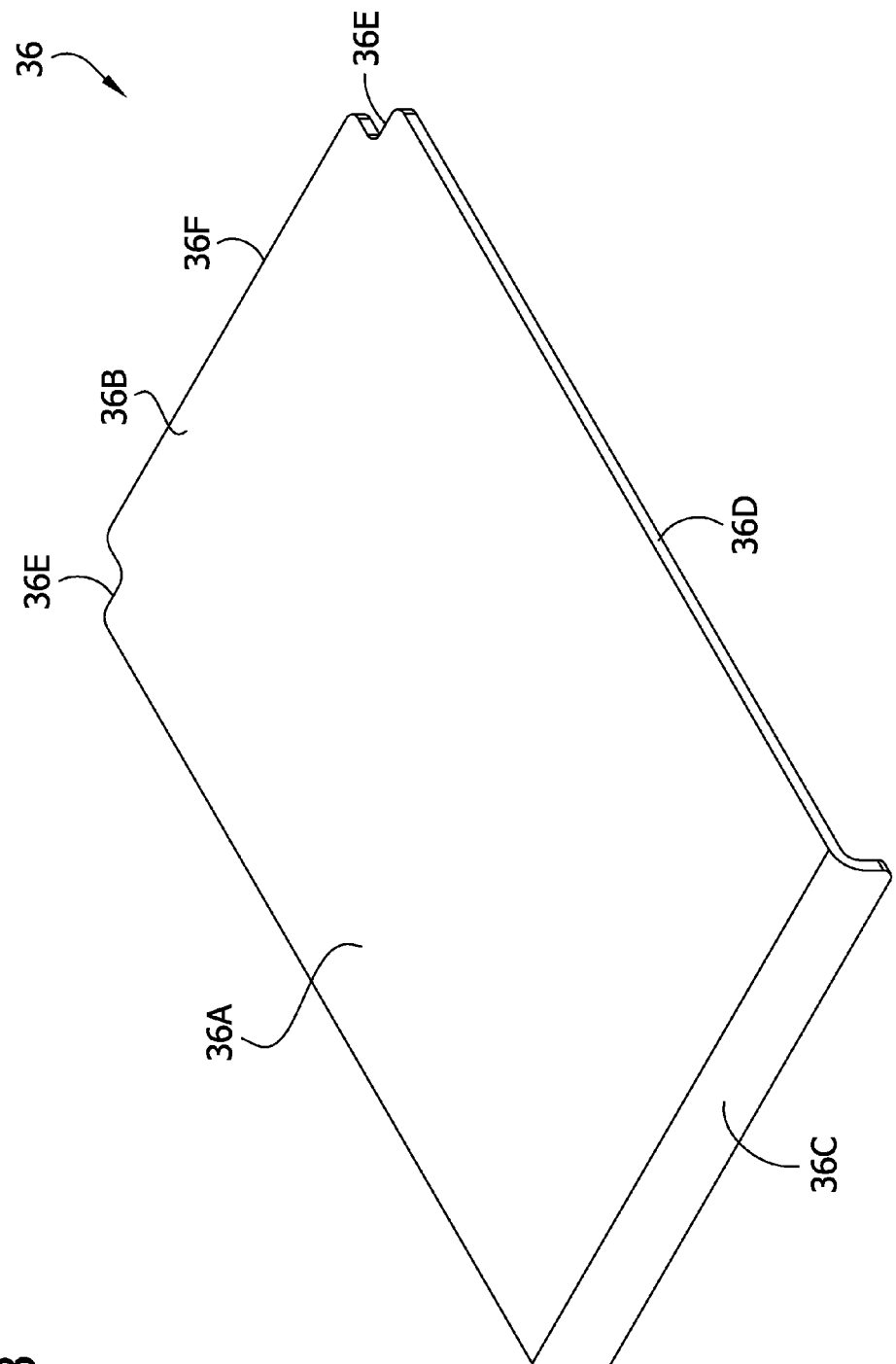
FIG. 8 is a rear perspective of the cover.

As shown in FIGS. 7 and 8, the cover 36 includes a pan covering section 36A having front and rear ends, a tongue 36B in front of and extending forward from the front end of the pan covering section, and a prop 36C behind and extending down from the rear end of the pan covering section. As will become apparent, the cover 36 is selectively receivable in and removable from the pan storage space 40 from the front opening. The cover 36 is constructed to permit the pan 38 to be slidably received under the cover in the pan storage space 40 and pushed into position below the cover in the pan storage space. The cover 36 may be formed of an acrylic material or any other suitable material.

The pan covering section 36A includes a generally rectangular body having a width and a length both greater than a thickness of the rectangular body. The bottom of the pan covering section includes a generally rectangular pan rim engagement surface 36D constructed to engage the pan rim 38F around the periphery of the pan rim to cover the open top of the pan 38 and desirably substantially seal (e.g., by the force of gravity on the cover 36) around the open top of the pan. In the illustrated embodiment, the bottom of the pan covering section 36A (i.e., pan rim engagement surface) is substantially planar, but other configurations may be used without departing from the scope of the present invention.

Referring to FIG. 8, the prop 36C in the illustrated embodiment comprises a downwardly turned flange extending along the entire width of the cover. The prop 36C includes an upper end connected to the pan covering section 36A and a lower end spaced from the upper end for engaging a support surface (e.g., slide surface 52 of the pan support 34) to prop the rear end of the pan covering section 36A spaced above the support surface. The prop 36C may be used to support the rear end of the pan covering section 36A as the pan 38 is slid into the pan storage space 40. Desirably, for reasons explained below, the prop 36C supports the rear end of the pan covering section 36A higher than the front end of the pan covering section when the cover 36 is in the pan storage space 40 and the pan is not in the pan storage space, and the prop has a height H1 about the same as but less than a height of the rim H2 (see FIG. 13). Props having other configurations may be used, or the prop may be omitted, without departing from the scope of the present invention.

Referring to FIG. 7, the tongue 36B is positioned at the front end of the cover and extends between the left and right sides of the cover. The cover 36 includes retainer engagement surfaces 36E on left and right sides of the tongue 36B. The retainer engagement surfaces 36E face forward and are constructed to engage the cover engagement surfaces 56 of the retainers 54 to retain the cover 36 in the pan storage space 40 when the pan 38 is received in the pan storage space under the cover. The engagement of the retainer engagement surfaces 36E with the retainers 54 maintains the cover 36 in the pan storage space 40 when the pan 38 is slid partially out of the pan storage space from the front opening. Other configurations and types of tongues and retainers may be used without departing from the scope of the present invention. For example, the tongue may be omitted and/or the retainer engagement surfaces may be positioned on the front edge of the cover.

Figure 9:
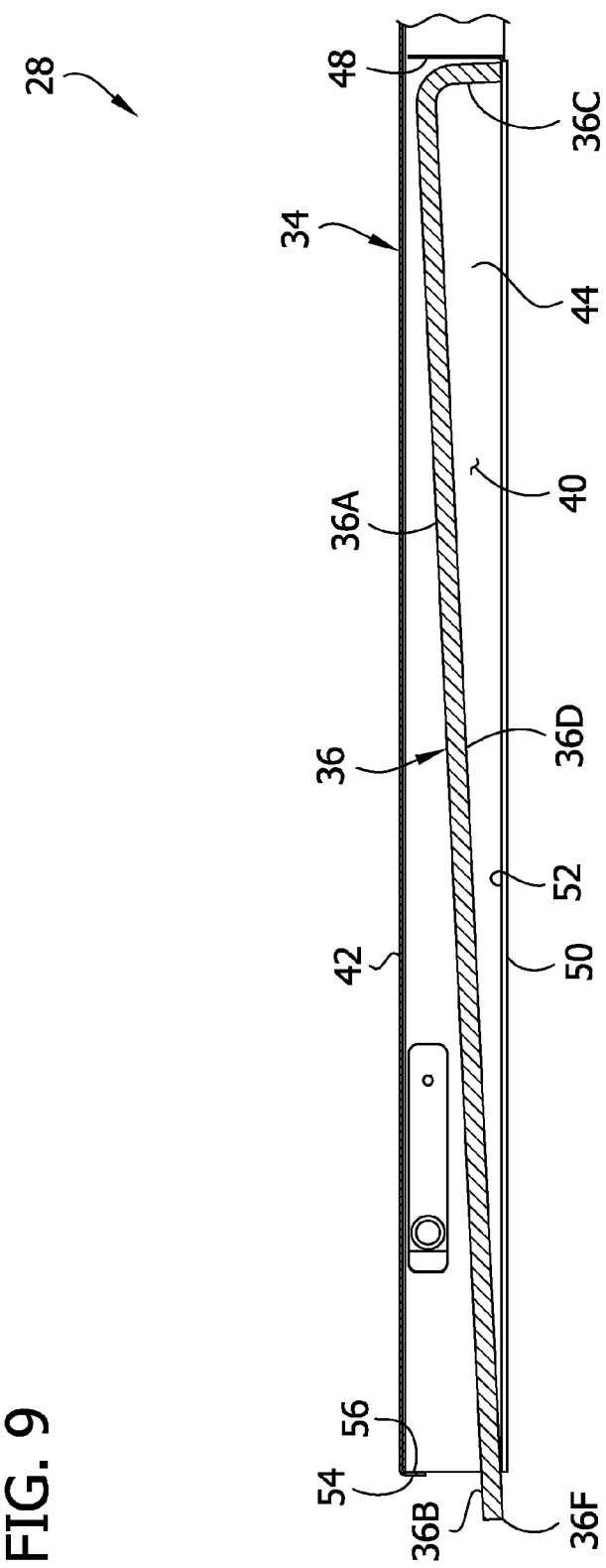
FIGS. 9-12 are sections of the pan storage module and pan illustrating a sequence of inserting the pan into a pan storage space of the pan storage module.

An example method of manipulating the pan storage module 28 will now be described with reference to FIGS. 9-14. FIG. 9 illustrates the cover 36 received in the pan storage space 40 in the pan support 34. The cover 36 has been inserted into the pan storage space 40 from the front opening. The prop 36C engages the rear ends of the slide surfaces 52 and supports the rear end of the pan covering section 36A higher than the front end of the pan covering section. The front end of the cover 36 is supported on the front end of the slide surfaces 52, and more specifically the bottom of the front end of the cover 36 to the right and left sides of the tongue 36B adjacent the retainer engagement surfaces 36E rests on the slide surfaces.

Figure 10:
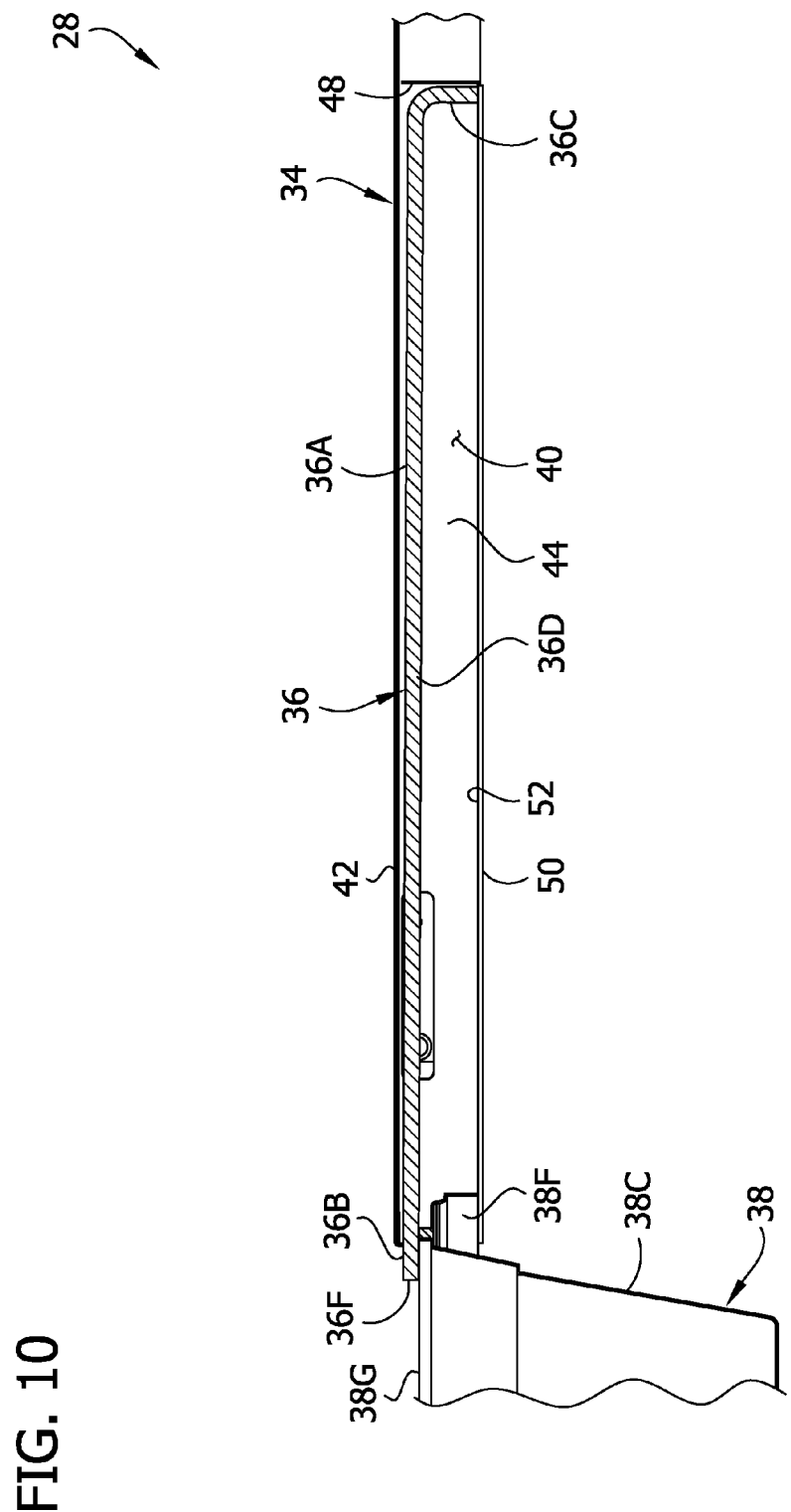

Referring to FIG. 10, the pan 38 (e.g., including food or other contents therein) may be used to lift the front end of the cover 36 so the pan can be slid into the pan storage space 40 under the cover. This moves the retainer engagement surfaces 36E of the cover 36 into retaining registration with the retainers 54. The front end of the cover 36 (e.g., the tongue 36B) may be constructed to facilitate lifting the front end of the cover to permit insertion of the pan 38 below the cover 36. The front end of the cover 36 includes a front edge 36F defined in the illustrated embodiment by the tongue 36B. The front edge 36F is positioned between and forward from the left and right retainer engagement surfaces 36E (see FIG. 7). When the cover 36 is received in the pan storage space 40, the tongue 36B extends out of the front opening, and the front edge 36F of the cover is positioned forward from the front opening outside the pan storage space. Moreover, the front edge 36F of the cover 36 is positioned forward from the front ends of the slide surfaces 52 so a bottom of the front edge is accessible in front of the slide surfaces for lifting the front end with the pan 38, as shown in FIG. 10. Other configurations may be used without departing from the scope of the present invention. For example, the front of the cover may not include a tongue, and the front edge of the cover may not be positioned outside the pan storage space or forward from the retainers when the cover is received in the pan storage space. It will be appreciated that in other configurations, such as where the front ends of the slide surfaces terminate short of the retainers and the cover does not extend forward of the retainers, the bottom of the front end of the cover could still be accessed for lifting the cover to permit insertion of the pan under the cover in the pan storage space.

Figure 11:
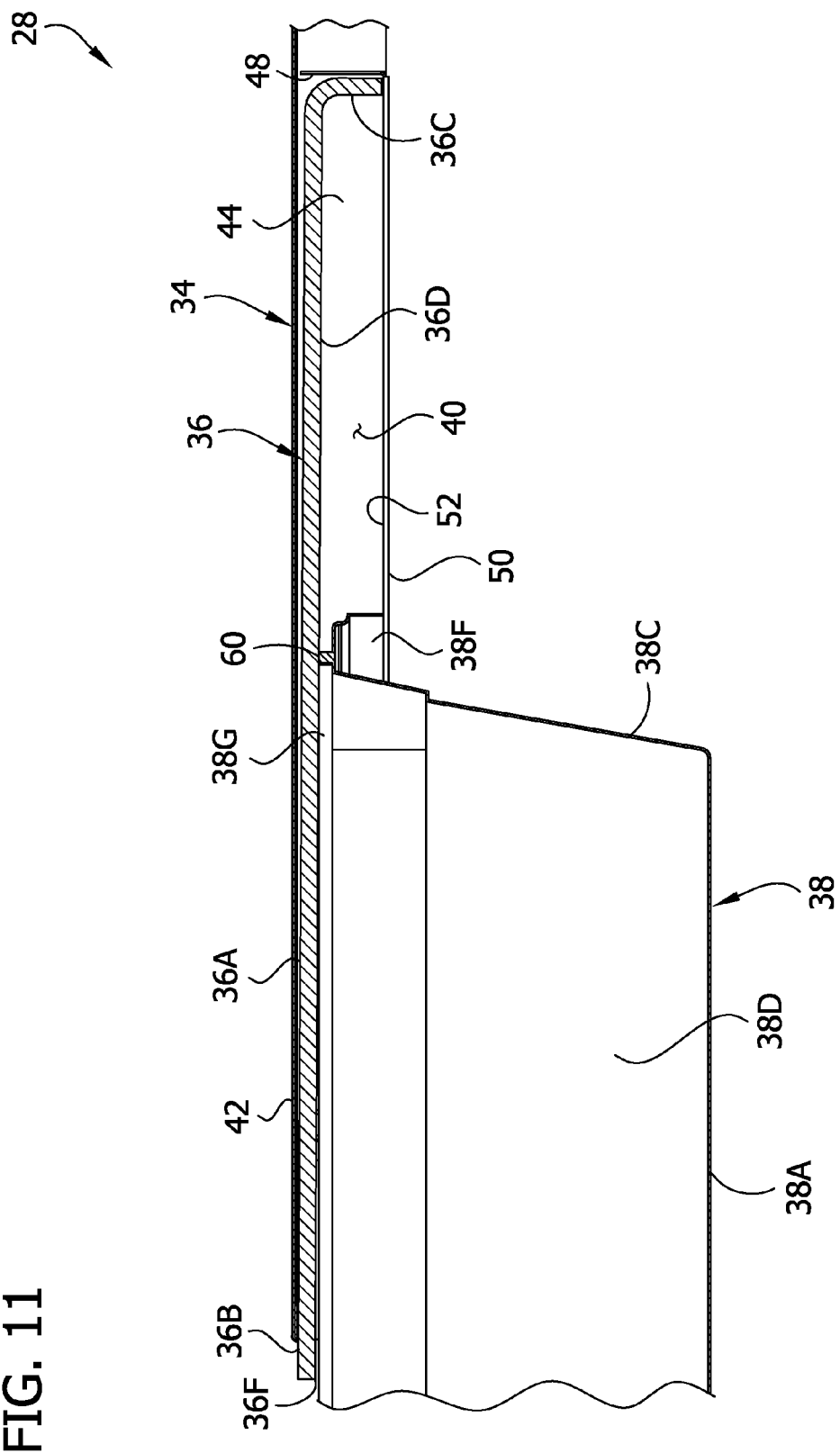
Figure 12:
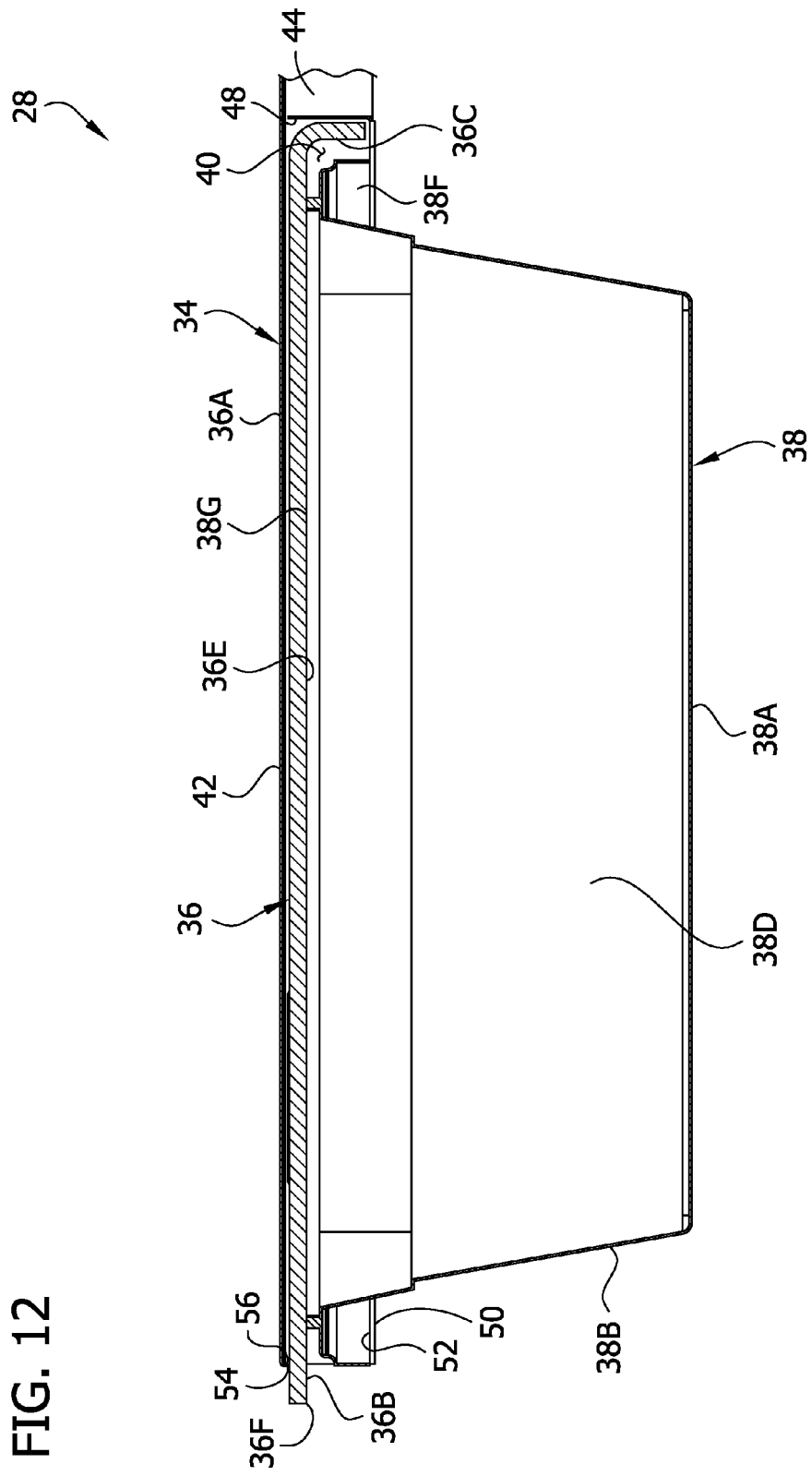
Figure 13:
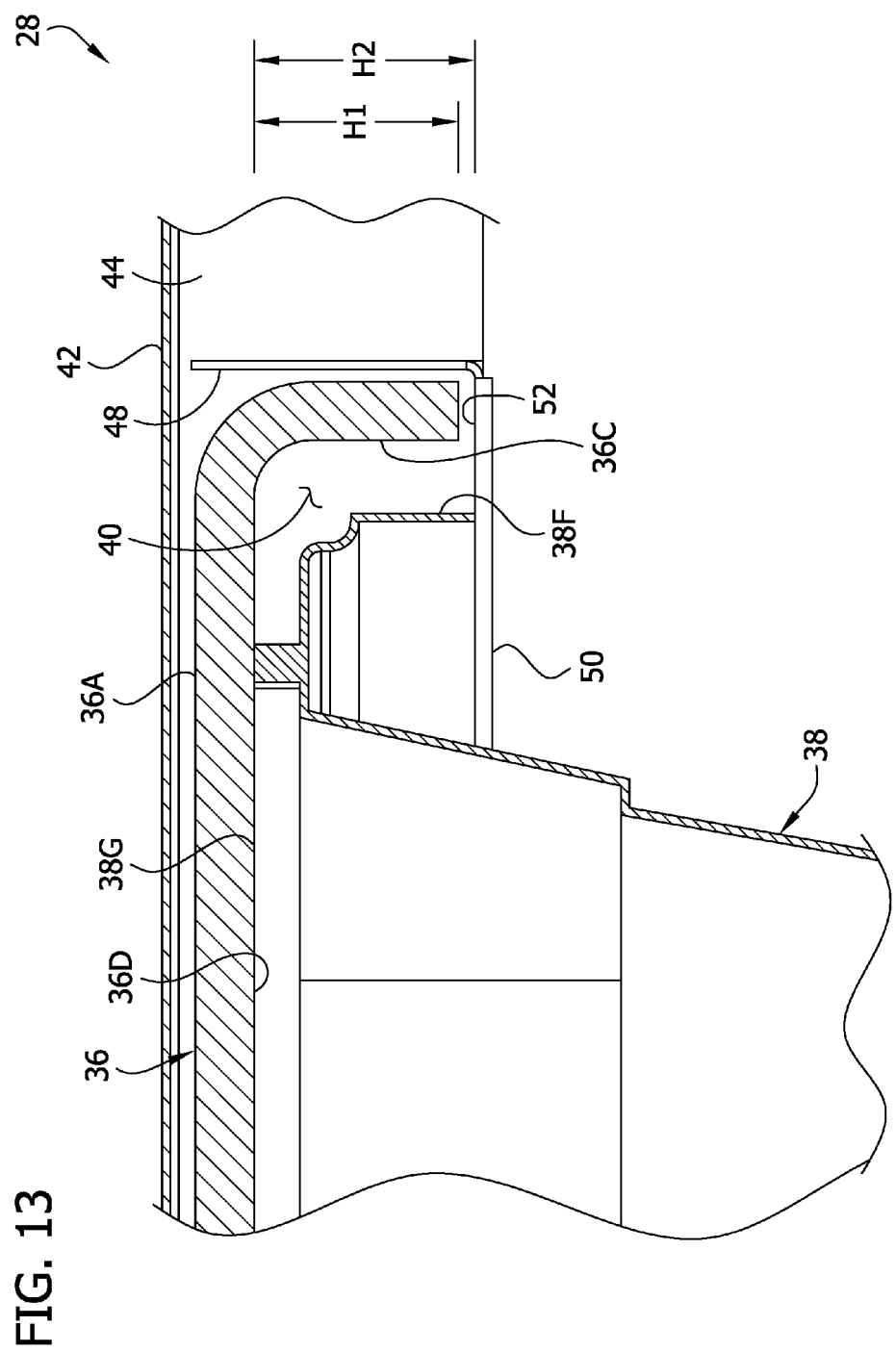
FIG. 13 is an enlarged view of a right portion of FIG. 12 showing a prop of the cover spaced above a slide surface of the pan support.

After the front end of cover 36 has been lifted, the pan can be slid into the pan storage space 40 by slidably engaging and supporting the left and right portions of the rim 38F with the left and right slide surfaces 52. Referring to FIGS. 10 and 11, when the user begins to slide the pan 38 into the pan storage space 40 along the slide surfaces 52, the front end of the pan covering section 36A is supported by the pan slightly higher than the rear end of the pan covering section supported by the prop 36C. This is because the rim 38F is taller than the prop 36C. The difference in elevation of the front and rear ends of the pan covering section 36A provides the pan covering section with an inclined orientation in which the pan rim engagement surface 36D slopes upwardly from the rear end of the pan covering section to the front end of the pan covering section. As the rear end of the pan 38 advances into the pan storage space 40, the rear portion of the rim 38F slides along the bottom of the pan covering section 36A, and the stops 48 of the pan support 34 prevent the cover 36 from moving rearward. Because the rear end of the pan covering section 36A is propped up by the prop 36C, the rear portion of the rim 38F slides with less friction along the bottom of the pan covering section, which makes it easier for a user to push the pan 38 into the pan storage space 40. The engagement of the rear portion of the rim 38F with the bottom of the pan covering section 36A defines a moving balance point 60 (FIG. 11) of the cover 36. As the rear portion of the rim 38F and thus the balance point 60 move rearwardly in the pan storage space 40, the weight of the cover 36 in front of the balance point eventually overcomes the weight of the cover behind the balance point, at which time the prop 36C is lifted off the slide surfaces 52 (broadly "support surface") and the pan covering section 36A changes from its inclined orientation to a generally horizontal orientation in which the pan rim engagement surface 36D engages more of the rim 38F than just the rear rim portion and in a generally flatwise manner. As shown in FIGS. 12 and 13, after the pan 38 is pushed fully into the pan storage space 40 into a stowed position, the pan rim engagement surface 36D engages substantially all of the rim 38F, and the pan covering section 36A covers the open top of the pan. As shown in FIG. 13, because the prop 36C has a height H1 shorter than the height H2 of the rear portion of the rim 38F, in the stowed position of the prop is not in engagement with the slide surfaces 52 and does not support the rear end of the pan covering section 36A. The shorter height of the prop 36C permits the bottom of the rear end of the pan covering section 36A to rest on the pan 38 to close the rear end of the open top. Desirably, in the stowed position of the pan 38, the pan by itself supports substantially the full weight of the cover 36 so the force of gravity on the cover causes the pan rim engagement surface 36D of the cover to engage and substantially seal around the open top. It will be understood the seal may not be fluid tight but at least provides a substantial barrier that assists in preventing gas flow through the open top.

Figure 14:
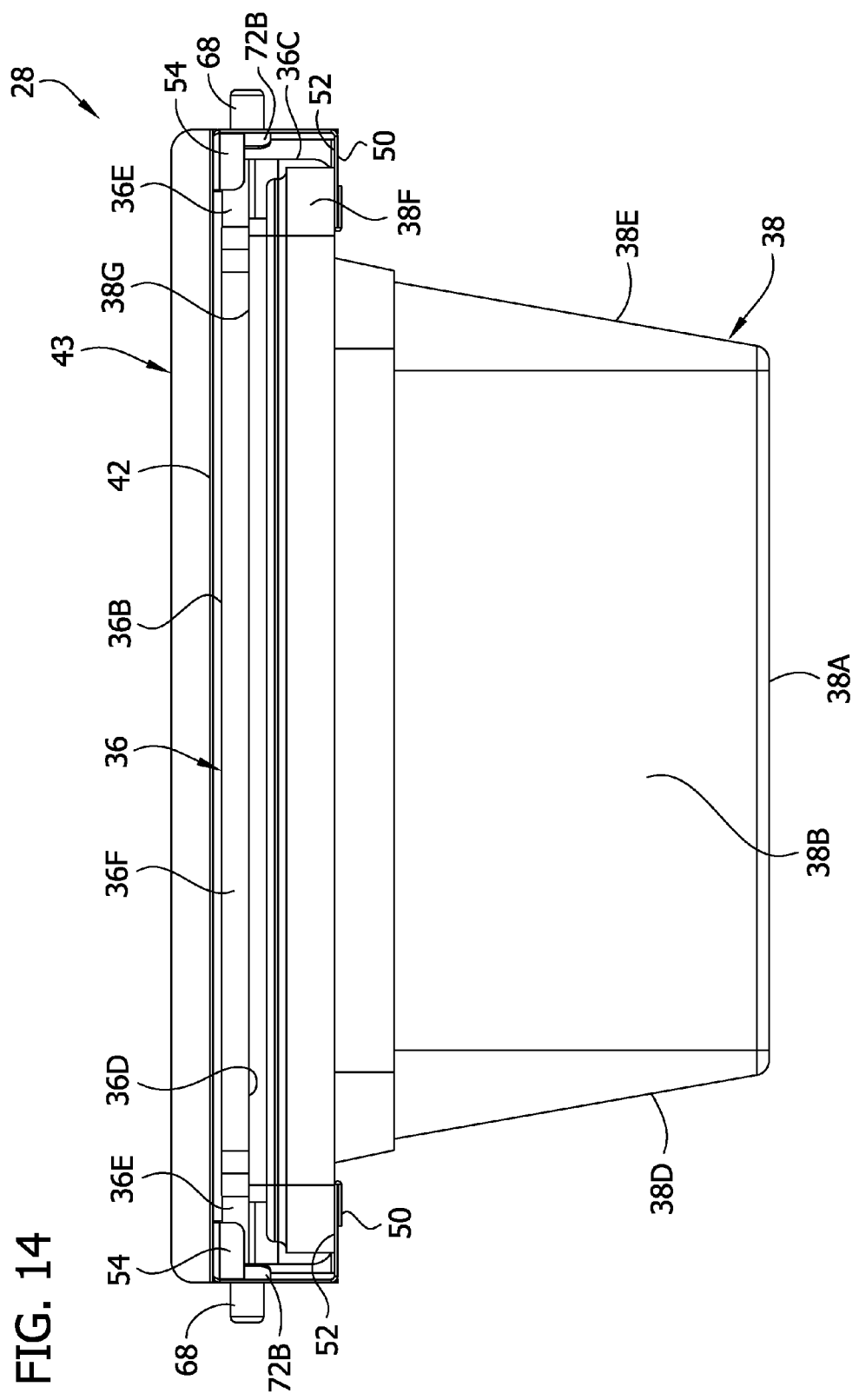
FIG. 14 is a front elevation of the pan storage module having the pan stored therein.

When it is desired to remove food or other contents from the stowed pan 38, the pan may be slid partially out of the pan storage space 40 from the front opening. As shown in FIG. 14, when the pan 38 is under the cover 36 in the pan storage space 40, the front end of the cover is supported by the pan in a position in which the retainer engagement surfaces 36E are in retaining registration with the retainers 54 (e.g., blocked by the retainers from exiting the front opening). Accordingly, as the pan 38 is slid forward out of the pan storage space 40, the cover 36 is retained in the pan storage space by the retainers 54. The user can move the pan 38 like a drawer partially out of and back into the pan storage space 40 to remove or place food or other contents in the pan. If the user does not pull the pan 38 entirely off the slide surfaces 52, the pan will remain at least partially supported by the slide surfaces, and the cover 36 will remain in retaining registration with the retainers 54 and blocked from exiting the front opening. For example, FIG. 11 shows the pan 38 in a position which may be described as partially pulled out of the pan storage space 40. As the pan 38 is pulled out of the pan storage space 40, the open top of the pan becomes uncovered, permitting the user to access the contents in the pan. It will be appreciated that this arrangement enables manipulation of the pan 38 and uncovering of the pan all with one hand, and the contents can be removed from the pan with the other hand of the user.

If the user desires to remove the pan 38 or cover 36 from the pan storage space 40, they can do so by pulling the pan off the slide surfaces 52 out of the front opening and optionally then removing the cover from the pan storage space. For example, the user may wish to refill the pan 38 with new contents, to clean the pan or cover 36, or to discard and replace the pan or cover. When the pan 38 is removed from the pan storage space 40, the front end of the cover 36 falls below the retainers 54 (the cover engagement surfaces 56), and the cover comes to rest in the position shown in FIG. 9, in which the retainer engagement surfaces 36E are out of retaining registration with the retainers. The pan support 34 and cover 36 are constructed to permit the retainer engagement surfaces 36E of the cover to fall out of retaining registration with the retainers (e.g., below and unblocked by the retainers) without the retainers being moved when the pan 38 is removed from the pan storage space 40. Accordingly, after the pan 38 is removed from the pan storage space 40, the cover 36 is removable from the pan storage space from the front opening without requiring movement of the cover engagement surfaces 56 of the retainers 54.

It will be appreciated that the configuration above provides several benefits. Pan storage systems constructed according to the present invention can be arranged such that a person can hold the pan 38, lift the front end of the cover 36, and slide the pan into the pan storage space 40 to be covered by the cover, all with one hand. Moreover, the cover 36 is easily removable from the pan storage space without requiring movement or actuation of the retainers 54. The configuration enhances ease of use and increases work efficiency. However, it will be appreciated more than one hand may be used, and movable retainers may be used, without departing from the scope of the present invention.

Referring again to FIG. 2, in another aspect of the present invention, the pan storage modules 28 may be selectively and releasably mountable on the frame 30 at various positions. In the illustrated embodiment, five modular pan supports 28 are shown mounted on the frame 30 at different elevations. In this particular example, the user selected to mount on the frame three pan storage modules 28 for relatively shallow pans at lower elevations and two pan storage modules 28 for relatively deeper pans at higher elevations. Other arrangements can be used without departing from the scope of the present invention. For example, the modular pan support system 26 may include fewer (e.g., one) or more pan storage modules, and the pan storage modules can be mounted in other arrangements. Moreover, one or more of the upper pan storage modules could be omitted to provide space above a shelf 12A of a lower pan storage module for permitting storage on the shelf.

Figure 15:
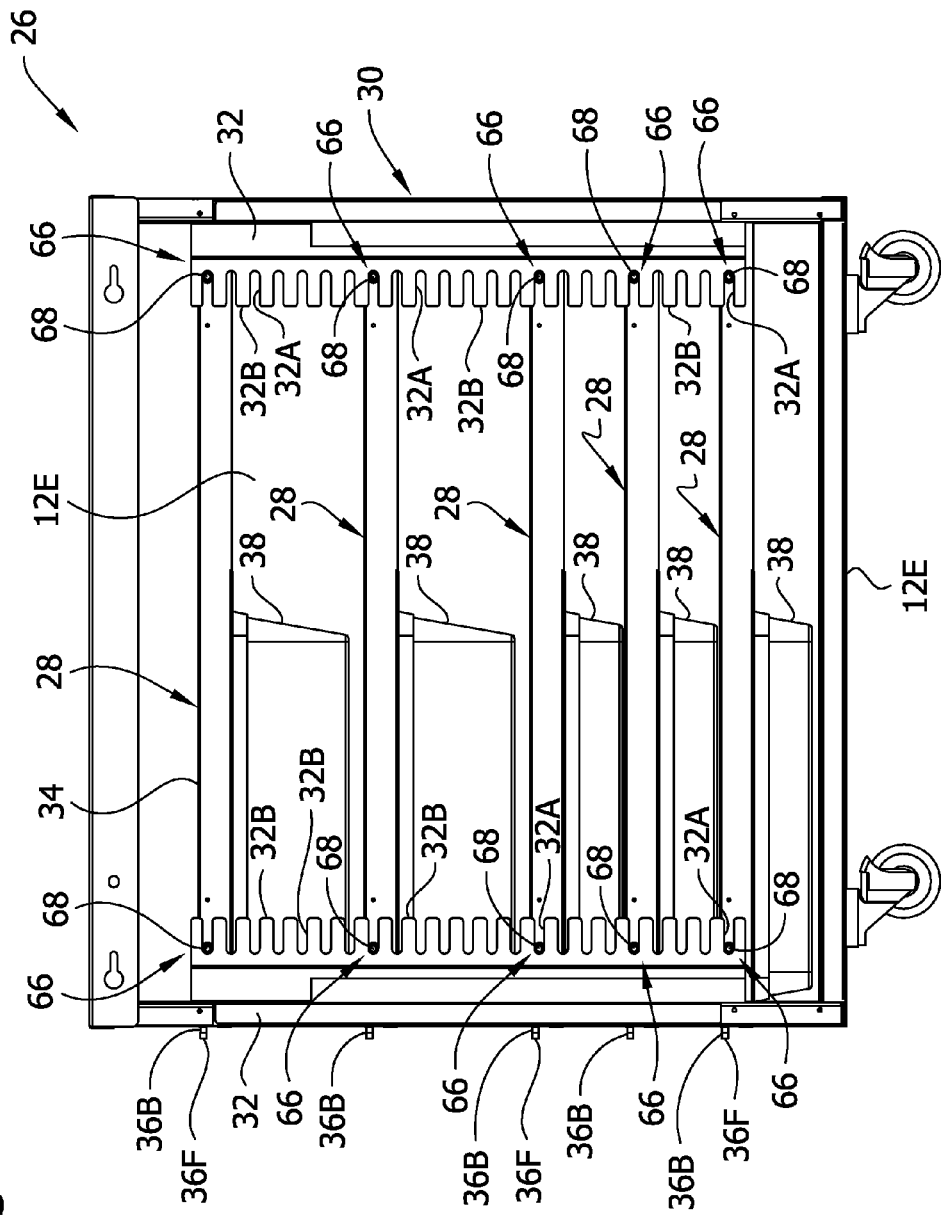
FIG. 15 is a right elevation of a lower portion of the pan storage unit having a right side wall removed to show releasable mounting connections of the pan storage modules with a frame of the pan storage unit.

As shown in FIG. 15, which is a right elevation of the housing 12 having the right side wall 12D removed, the modular pan support system 26 includes a plurality of releasable mounting connections 66 for selectively mounting the pan storage modules 28 on the frame 30. Each pan storage module 28 includes a plurality of first elements of the releasable mounting connections 66, the frame 30 includes a plurality of second elements of the releasable mounting connections, and the first and second elements are configured to be engaged or interfaced with each other to releasably mount the pan storage modules on the frame.

As shown in FIGS. 3, 5, 6, and 16, in the illustrated embodiment the pan storage modules 28 include first elements 68 in the form of pins (broadly "protrusions"). Two pins 68 are provided on each side of the pan storage module 28. The pins 68 are mounted on the respective left and right side walls 44, 46 of the pan support 34 and extend through openings 70 in the sides of the side walls. The pins 68 are secured to the inside of the left and right side walls 44, 46 by biasing members 72 in the form of resiliently deflectable tabs, shown most clearly in FIGS. 6 and 16. Each tab 72 includes an anchoring section 72A adjacent a proximal end where the tab is secured to the respective side wall 44, 46 of the pan support (e.g., by a rivet). The distal end of the tab 72 includes a grip 72B in the form of a flap extending transversely with respect to the tab, and the pin 68 is connected to the tab adjacent the distal end between the grip and proximal end. The arrangement is such that the tabs 72 normally rest in generally coplanar relationship with the inside surfaces of the side walls 44, 46, and the pins 68 normally protrude from the sides of the pan support 34 in a mounting position. The pins 68 can deflect inward temporarily to a releasing position, under a deflecting force applied to the pins against the bias of the tabs 72 from outside the side walls 44, 46 or applied to the grips 72B inside the side walls. When a pin 68 is deflected, the resilient tab 72 applies a biasing or spring force to the pin to cause the pin to resume its mounting or protruding position with respect to the side of the pan support 34 when the deflecting force is no longer applied.

Referring to FIG. 15, the right side of the frame 30 includes front and rear racks 32 each including a plurality of openings 32A (broadly "second elements" of the releasable mounting connections 66) in the form of slots having an open end and a closed end. The slots 32A are sized for receiving the pins 68 for mating engagement with the pins and are spaced from one another at intervals along the height of the racks 32. The racks 32 have teeth 32B separating the openings from one another. Although not shown, it will be understood the left front and rear racks 32 have the same configuration as the right front and rear racks 32 shown in FIG. 15. The open ends of the slots 32A on the front racks 32 face rearward, and the open ends of the slots on the rear racks face forward. The arrangement is such that the racks 32 define a plurality of elevations at which the pan storage modules 28 can be releasably mounted. The pins 68 of a pan storage module 28 are receivable in slots 32A of the racks 32 at a common elevation for mounting the pan storage module 28 on the frame 30 in a generally horizontal orientation. For example, a pan storage module 28 can be inserted in the interior of the frame 30 from the front by deflecting the rear pins 68 to their releasing position to permit them to pass the left and right front racks 32, allowing the rear pins to spring back to their mounting positions, guiding the rear pins into open ends of slots 32A in the rear racks 32, deflecting the front pins 68 temporarily to their releasing positions, moving the front pins into the front racks, and permitting the front pins to spring back to their mounting or protruding positions inside slots 32A in the front racks. The front and rear pins 68 desirably engage or are positioned immediately adjacent the closed ends of the slots 32A to prevent movement of the pan storage module 28 forward or rearward in the frame 30. Engagement of the racks 32 with the sides of the pan storage modules 28 prevents movement of the pan storage modules to the left or right with respect to the frame. Finally, engagement of the pins 68 with upper and lower edges of the slots 32A prevents vertical movement of the pan storage modules 28 in the frame 30. Accordingly, the releasable mounting connections 66 are constructed for preventing movement of the pan storage modules 28 horizontally and vertically with respect to the frame. Pan storage modules 28 can be removed from the frame 30 by reversing the installation process (e.g., by applying a deflecting force to the tabs 72 using the grips 72B when the pan 38 and cover 36 are removed from the pan storage space 40).

It will be understood that other releasable mounting connections, fewer or more releasable mounting connections, and other arrangements of mounting connections, can be used without departing from the scope of the present invention. For example, the elements of the releasable mounting connections on the frame and pan storage module can be swapped. In other words, for example, the pins 68 could be provided on the frame 30, and the openings 32A could be provided on the pan storage modules 28, or some of each of the pins and openings may be provided on the frame and the pan storage modules. In addition, other types of first and second elements, such as clips, clamps, teeth, cams, ribs, flanges, other mating elements, etc. could be used without departing from the scope of the present invention. Moreover, other biasing members could be used (e.g., other types of springs), the biasing members could be provided on the frame instead of the pan storage module, and the biasing members could be omitted, without departing from the scope of the present invention. Finally, the releasable mounting connections may be omitted without departing from the scope of the present invention. In other words, the pan storage module may stand alone or may be mounted to the frame in a non-releasable fashion.

Figure 17:
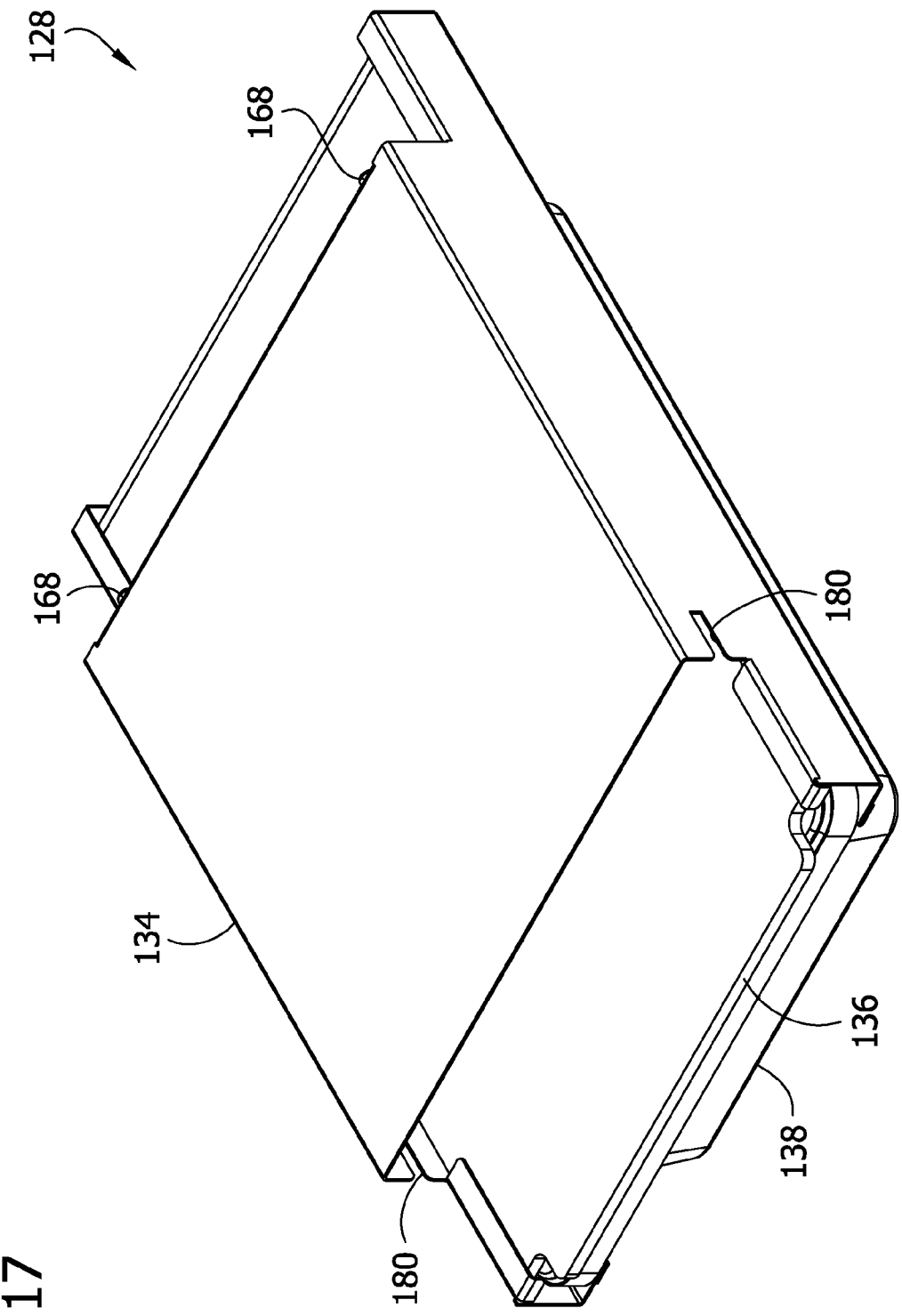
FIG. 17 is a front perspective of a second embodiment of a pan storage module embodying aspects of the present invention.
Figure 18:
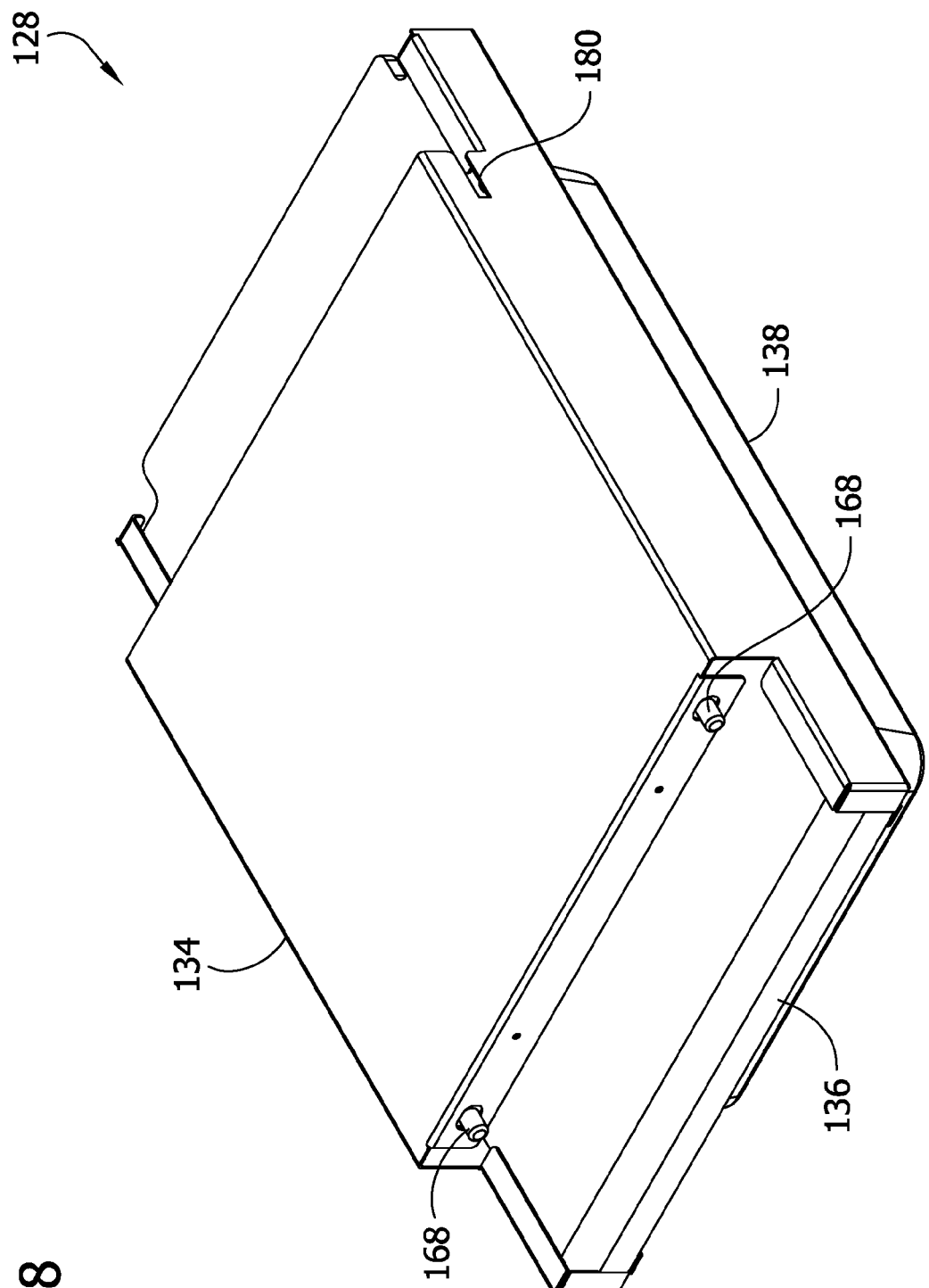
FIG. 18 is a rear perspective of the second embodiment of the pan storage module.

Referring to FIGS. 17 and 18, a second embodiment of a pan storage module of the present invention is generally designated by the reference number 128. The pan storage module 128 of this embodiment is similar to the pan storage module 28 of the first embodiment, and like parts are designated with like reference numbers, plus 100. For example, the pan storage module 128 includes a pan support 134, a cover 136, and a pan 138. The pan support 134 is constructed for receiving and supporting the cover 136 and the pan 138 in essentially the same way as the first embodiment, and the cover and pan have essentially the same construction as the cover 36 and pan 38. However, the pan support 134 is constructed for forming releasable mounting connections for releasably mounting on a frame (not shown) in a different manner than the first embodiment. The pan storage module 128 is constructed for mounting on a frame using a pair of open ended slots 180 provided at the front end of the pan support 134 (see FIG. 17) and a pair of pins 168 provided on the rear end of the pan support (see FIG. 18). The pins 168 have essentially the same construction as the pins 68 described above and can be moved between a mounting or protruding position and a releasing or deflected position, but the pins 168 have a different arrangement and orientation. To releasably mount the pan storage module 128 on a frame, for example, the open ended slots 180 (broadly "first elements") could be received over flange portions (broadly "second elements") provided on one or more racks of the frame, forming releasable mounting connections, and the pins 168 (broadly "first elements") could be received in openings (broadly "second elements") on one or more racks of the frame, forming releasable mounting connections.

Figure 19:
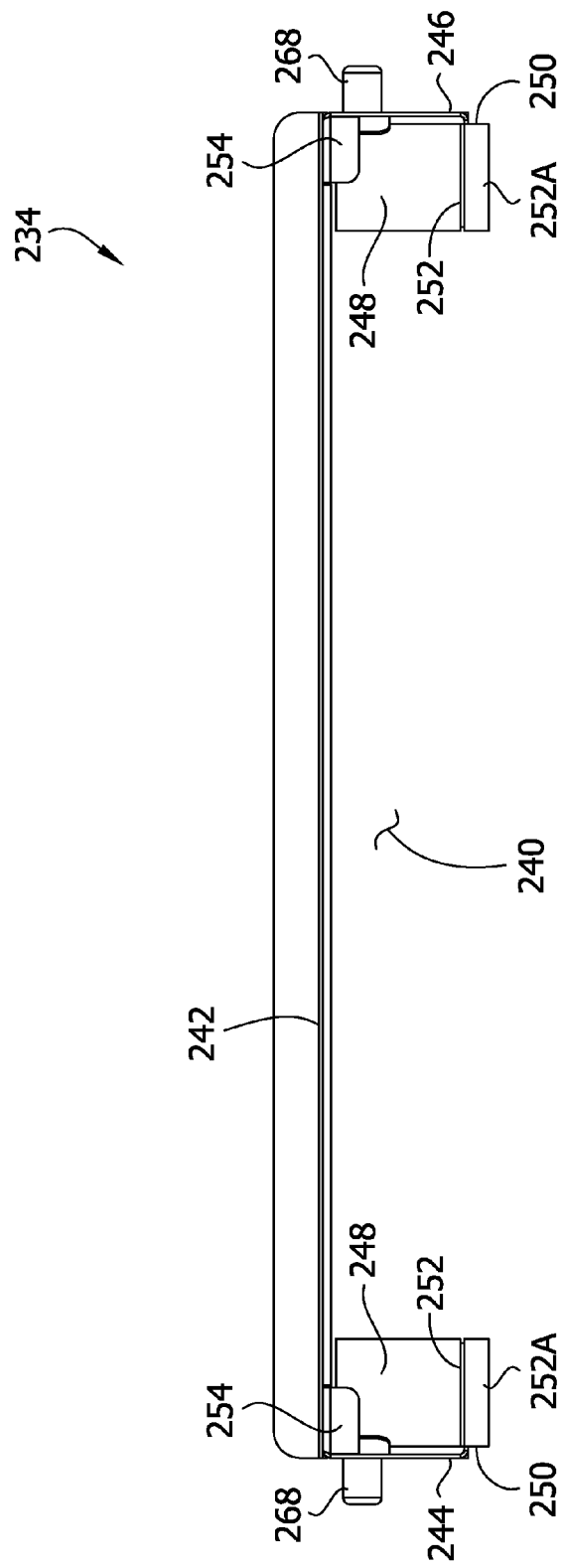
FIG. 19 is a front elevation of a pan support of a third embodiment of a pan storage module embodying aspects of the present invention.
Figure 20:
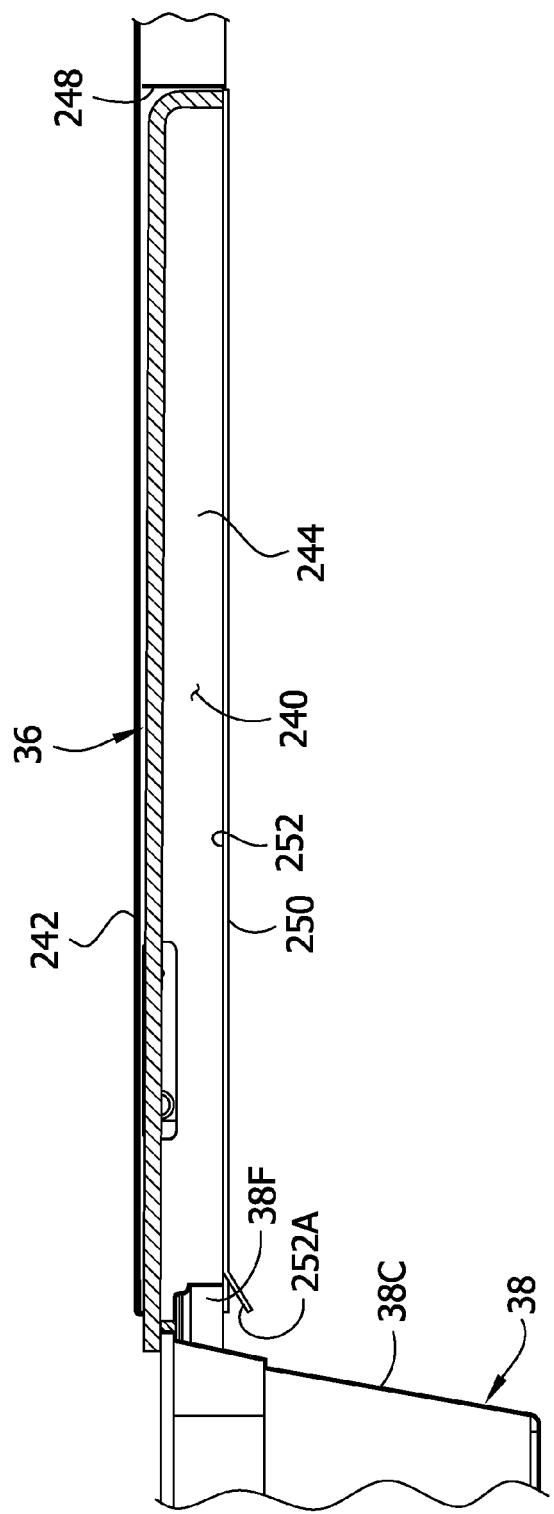
FIG. 20 is a section of the third embodiment of the pan storage module having a pan partially inserted into a pan storage space of the pan storage module.

Referring to FIGS. 19 and 20, a third embodiment of a pan support of the present invention is generally designated by the reference number 234. The pan support 234 of this embodiment is essentially the same as the pan support 34 of the first embodiment, and like parts are designated with like reference numbers, plus 200. For example, the pan support 234 includes a pan storage space 240 bounded by a top wall 242 forming a shelf above the pan storage space, and left and right side walls 244, 246 extending down from the top wall on left and right sides of the pan support. Left and right stops 248 are positioned at the rear end of the pan storage space 240. The pan support 234 includes a front opening between the left and right sides of the pan support, rails 250 protruding inwardly into the pan storage space 240 from the side walls 244, 246, and slide surfaces 252 extending rearwardly from adjacent the front opening toward the rear of the pan storage space 240. It will be appreciated the cover 36 and pan 38 of the first embodiment can be used with this pan support 234 in essentially the same was as described with respect to the first embodiment, and that the pan support 234 can be part of a modular pan support as described above. Retainers 254 are provided for retaining the cover 38 in the pan storage space 240, and pins 268 are provided for releasably mounting the pan support. In this embodiment, the slide surfaces 252 have front ends including ramps 252A that help guide the rear end of the pan 38 under the cover 36, onto the slide surfaces 252, and into the pan storage space 240. More particularly, as shown in FIG. 20, the ramps 252A provide greater tolerance for a user to align the front portion of the rim 38F with the front opening for pushing the pan 38 into the pan storage space 240. In the illustrated embodiment, the ramps extend forward and downward at an angle of about 45 degrees with respect to horizontal. For example, the ramps 252A may be formed by bending the front ends of the rails 250 downward. Ramps having other configurations and other types of ramps can be used without departing from the scope of the present invention.

Referring to FIGS. 21-32, a second embodiment of a pan storage unit is designated generally by the reference number 310. The pan storage unit is substantially similar to the pan storage unit 10 described above with respect to FIGS. 1-16, and like parts are indicated by like reference numbers, plus 300.

The pan storage unit 310 comprises a cart including a lower housing 312 or cabinet supported on casters 313 and an upper storage/preparation area 314 above the housing. The housing 312 includes top, bottom, left, and right walls 312A-312D, defining an interior therein, and two partitions 312E, 312F extending vertically between the top and bottom walls 312A, 312B dividing the interior into left, middle, and right compartments. The housing 312 has an open front and open back. In the illustrated embodiment, the left compartment is used for housing a waste basket 316, and the right compartment is used for storing a plurality of pans, as will be described in further detail below. The upper storage/preparation area 314 includes a plurality of uprights 318 supporting an upper shelf 322 above the storage compartment and another pan storage area under the upper shelf. Other configurations and arrangements may be used without departing from the scope of the present invention.

Figure 21:
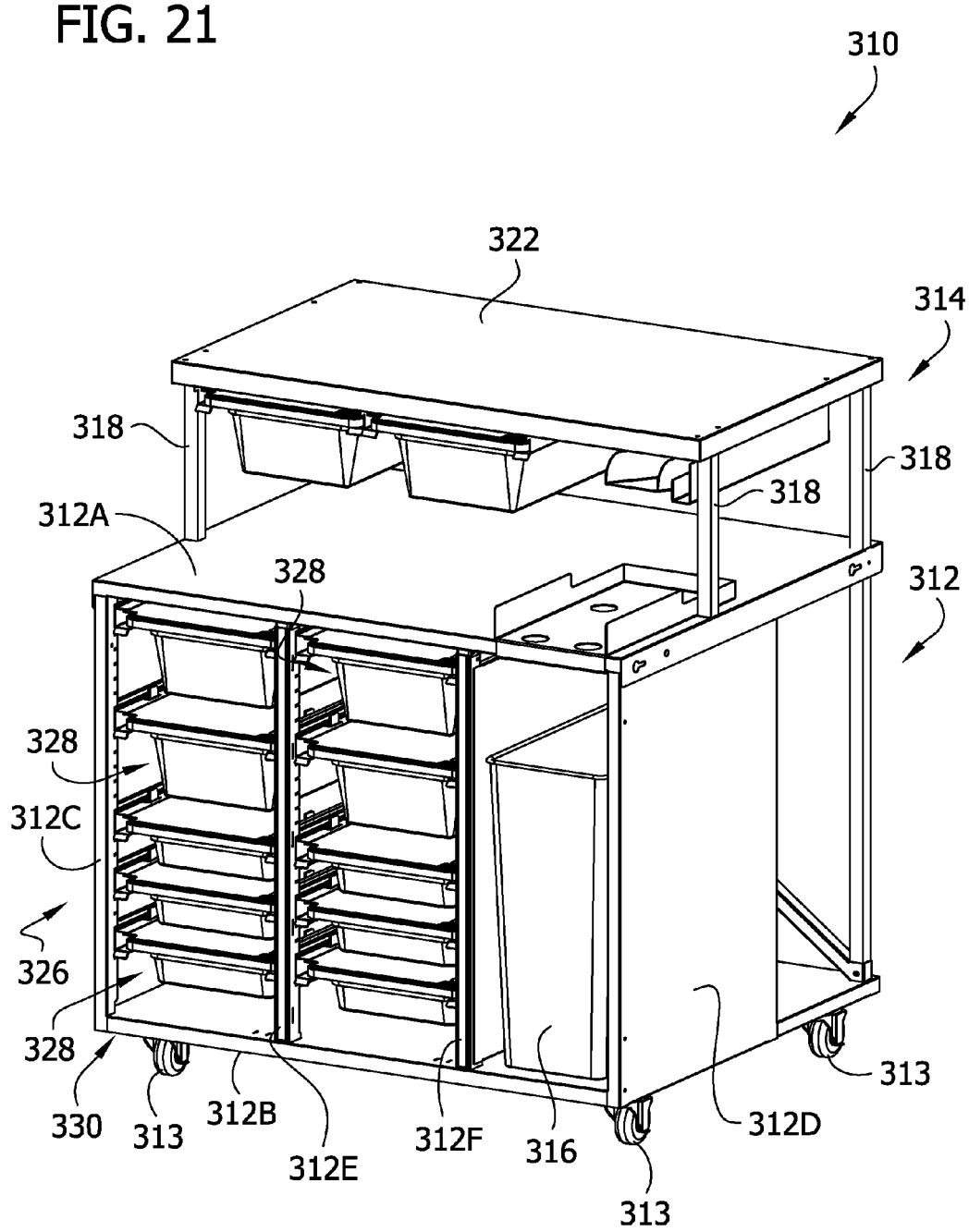
FIG. 21 is a front perspective of a second embodiment of a pan storage unit embodying aspects of the present invention.
Figure 22:
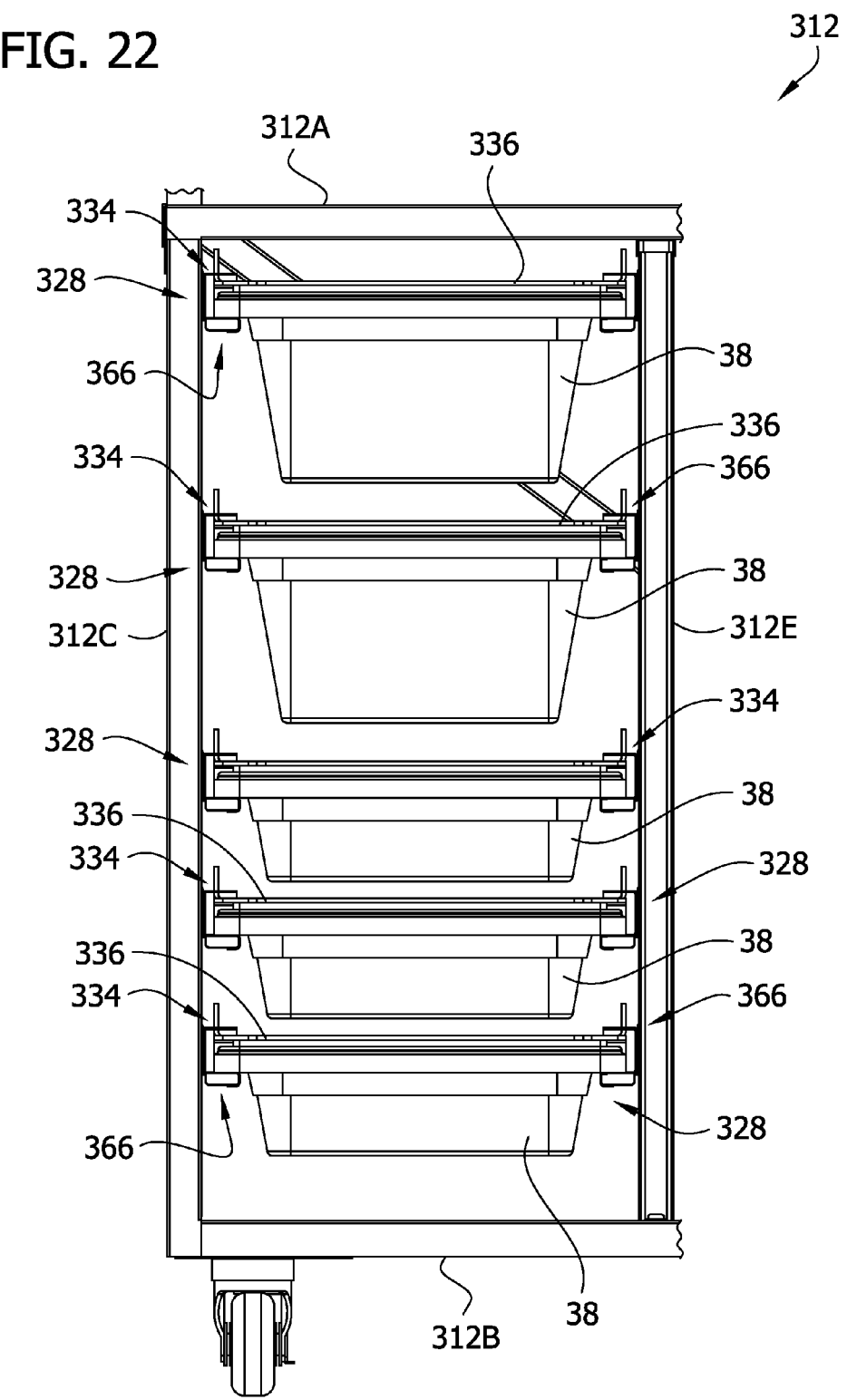
FIG. 22 is a front elevation of a lower portion of the pan storage unit of FIG. 21.

Referring to FIG. 22, in which the left compartment of the cabinet 312 is shown in closer detail, the pan storage unit 310 includes a modular pan support system, generally indicated by the reference number 326, including a plurality of pan storage modules 328 and a frame 330 on which the pan storage modules are selectively mountable in various positions. In the illustrated embodiment, the frame 330 includes the left side wall 312C, the partition 312E, and left sections of the top and bottom walls 312A, 312B of the cabinet 312 forming the left compartment of the cabinet. The frame 330 also includes racks 332 mounted inside the partition 312E and left side wall 312C (e.g., see FIG. 31) for releasably mounting the pan storage modules 328 on the frame, which will be described in further detail below. It will be appreciated that a similar frame is provided in the middle compartment to the right of the left compartment for mounting additional pan storage modules, as shown in FIG. 21. As will become apparent, as with the unit 10 described above, contents stored in a pan of the modular pan support system 326 can be accessed by pulling the pan forward from a stowed position to expose an open top of the pan and its contents therein, while the pan remains at least partially supported by the pan support system, and the pan with remaining contents can then be pushed rearward to return the pan to its stowed position, or the pan can be removed from the pan support system (e.g., for emptying and/or cleaning).

Figure 23:
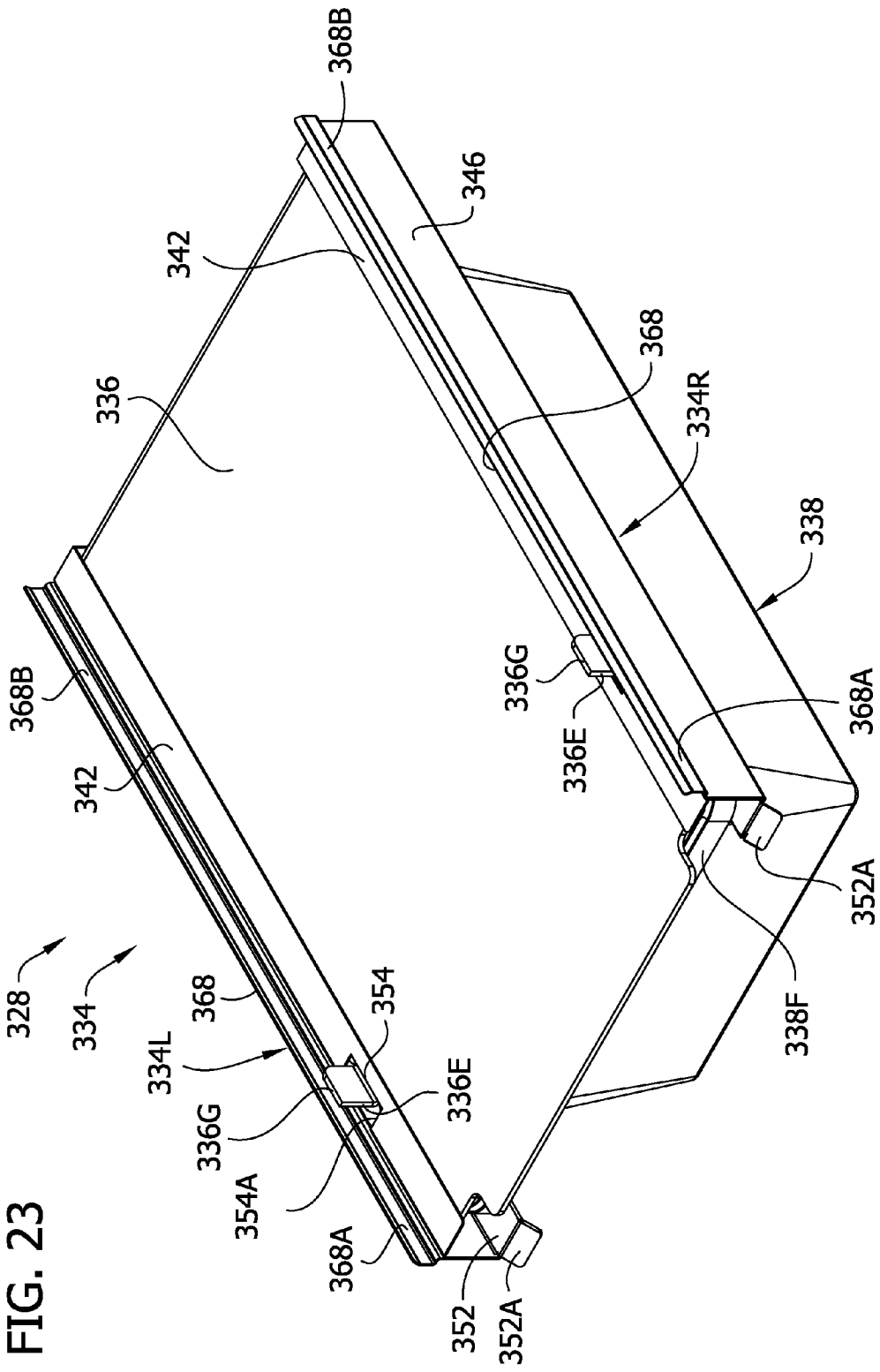
FIG. 23 is a front elevation of a pan storage module of the pan storage unit.
Figure 24:
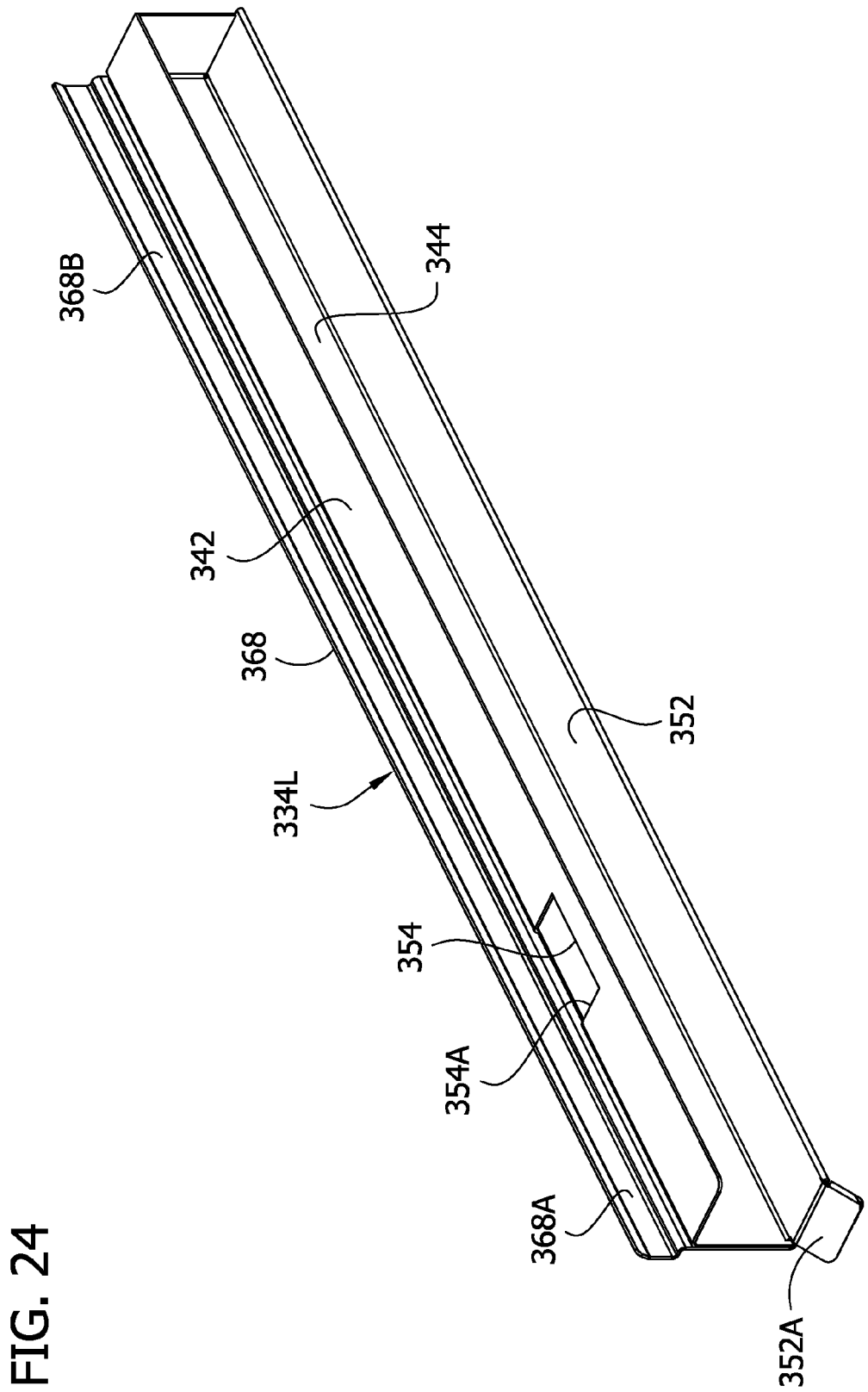
FIG. 24 is a front elevation of a left side of a pan support of the pan storage module of FIG. 23.

Referring to FIG. 23, a pan storage module 328 is shown removed from the frame 330. The pan storage module 328 includes a pan support 334 having a left side 334L and a right side 334R and a cover 336 for supporting and covering the pan 338. In this embodiment, the left and right sides 334L, 334R of the pan support 334 are separate pieces. The left side 334L of the pan support 334 is shown in closer detail in FIG. 24. It will be understood that the right side 334R of the pan support has essentially the same but mirror image construction compared to the left side 334L. The left and right sides 334L, 334R are selectively positionable to be separately mounted on the frame 330 with respect to each other for forming the pan support 334. The pan 338 and cover 336 are removably receivable in the pan support 334. Accordingly, the pan 338 and cover 336 can be selectively placed in and removed from the pan support 334.

The pan (e.g., "food pan") 338 has essentially the same construction as the pan 38 described above with respect to FIG. 4. For example, the pan 338 includes a rim 338F extending around the periphery of the pan adjacent an open top of the pan. The rim 338F includes front, rear, left, and right rim portions corresponding to the respective sides of the pan 338. The rim 338F includes a raised rib 338G extending around the periphery of the rim providing the rim with increased height. Other types of pans and pans having other configurations may be used without departing from the scope of the present invention. For example, the rim may extend around only part of the periphery of the pan (e.g., only the left and right sides), the rim may not be positioned at the top opening, and the raised rib may be omitted, without departing from the scope of the present invention.

The pan support 334 includes a pan storage space 340 bounded at least partially by side walls 344, 346 of the left and right sides 334L, 334R of the pan support. Both the left and right sides 334L, 334R include stops 348 positioned at the rear end of the pan storage space 340 for preventing the pan 338 and cover 336 from exiting the rear of the pan storage space. For example, as will become apparent, the stops 348 may maintain the cover 336 in position in the pan storage space 340 as the pan is slid into the pan storage space below the cover 336. The pan support 334 includes a front opening between the left and right sides 334L, 334R of the pan support sized to permit the pan 338 to be received in the pan storage space 340 from the front opening (e.g., at least an upper portion of the pan including the rim 338F).

Figure 26:
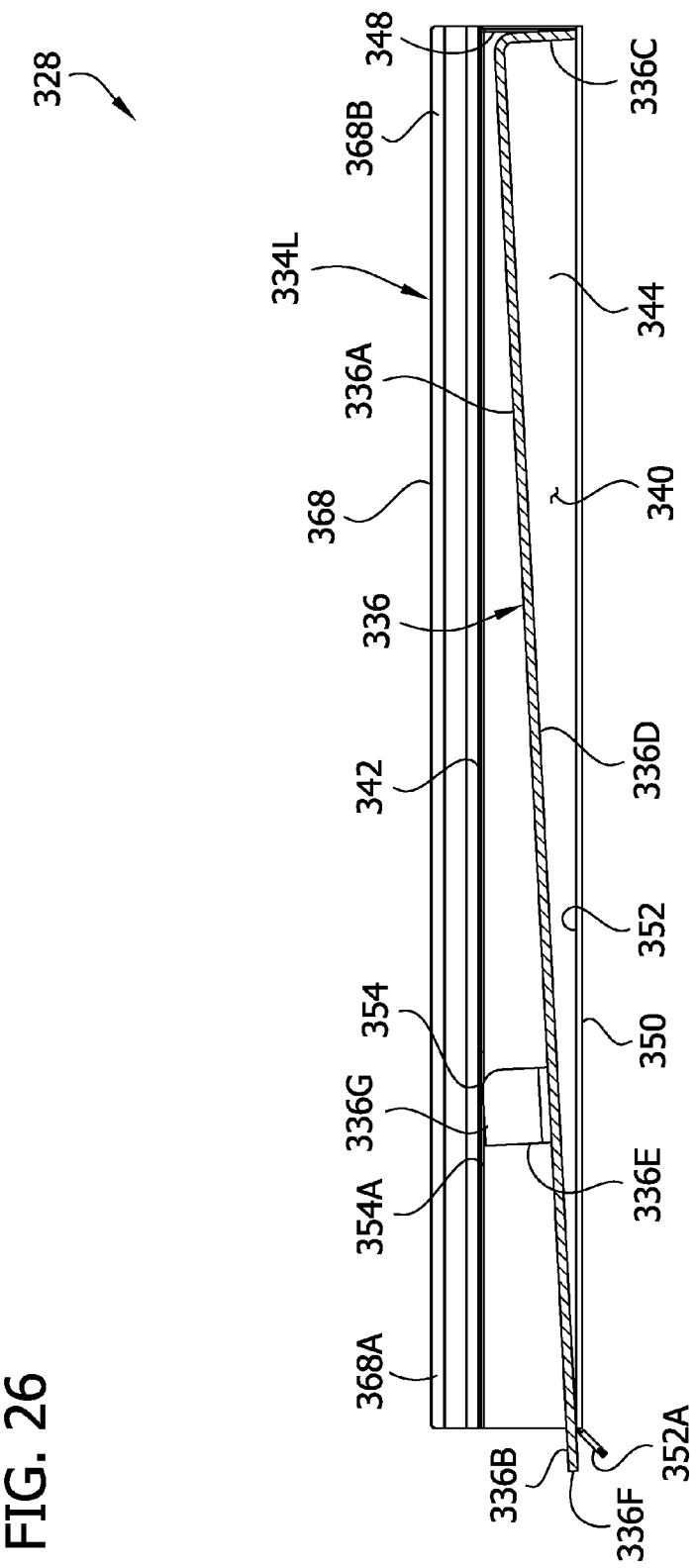
FIGS. 26-29 are sections of the pan storage module and a pan illustrating a sequence of inserting the pan into a pan storage space of the pan storage module.

The pan support 334 includes rails 350 protruding inwardly into the pan storage space 340 from the side walls 344, 346. The rails 350 include respective upwardly facing slide surfaces 352 extending rearwardly from adjacent the front opening toward the rear of the pan storage space 340. The slide surfaces 352 are constructed and positioned to slidably receive and support the pan 338 on the slide surfaces in the pan storage space 340. More specifically, the slide surfaces 352 slidably receive and support the left and right portions of the rim 338F. In the illustrated embodiment, the slide surfaces 352 have front ends terminating at the front opening of the pan storage space 340 and rear ends terminating at the rear end of the pan storage space, and the slide surfaces extend continuously therebetween. The slide surfaces 352 have front ends including ramps 352A that help guide the rear end of the pan 338 under the cover 336, onto the slide surfaces 352, and into the pan storage space 340. More particularly, as shown in FIG. 26, the ramps 352A provide greater tolerance for a user to align the front portion of the rim 338F with the front opening for pushing the pan 338 into the pan storage space 340. In the illustrated embodiment, the ramps extend forward and downward at an angle of about 45 degrees with respect to horizontal. For example, the ramps 352A may be formed by bending the front ends of the rails 350 downward. Ramps having other configurations and other types of ramps can be used without departing from the scope of the present invention. Moreover, other configurations of slide surfaces may be used without departing from the scope of the present invention. For example, the slide surfaces may be discontinuous or shorter or longer than illustrated, the ramps may be omitted, and a slide surface may be positioned for slidably receiving and supporting the bottom of the pan 338 rather than the rim 338F.

It will be appreciated that in the illustrated embodiment the pan storage module 328 and in particular the pan support 334 is free of support structure positioned to engage the bottom of the pan 338 for supporting the bottom of the pan in the pan storage space 340. The pan support 334 is constructed so the pan "hangs" or is suspended by the engagement of the rim 338F with the pan support slide surfaces 352. However, support structure for engaging and supporting the bottom of the pan 338 may be used without departing from the scope of the present invention.

The pan support 334 includes left and right retainers 354 for retaining the cover 36 in the pan storage space 340 when the pan 338 is received therein, as will become apparent. In this embodiment, the retainers 354 comprise openings in upper walls 342 of the left and right sides 334L, 334R of the pan support. The retainers 354 include rearward facing cover engagement surfaces 356 in the form of front edges of the openings for engaging the cover 336 to retain the cover inside the pan storage space 340 when the pan is received at partially therein under the cover. The retainers 354 are constructed to permit the cover 336 to be slidably received on the slide surfaces 352 from the front opening below the retainers and slid into the pan storage space 340 along the slide surfaces without requiring movement of the retainers. The retainers 354 are also constructed to permit the pan 338 to be slidably received on the slide surfaces 352 from the front opening below the retainers and cover 336 and to be slid into the pan storage space 340 along the slide surfaces into position under the cover without requiring movement of the retainers. The retainers 354 and in particular the cover engagement surfaces 356 are fixed in position on the pan support 334. Other configurations and types of retainers may be used without departing from the scope of the present invention. For example, one, three, or more retainers may be used, the retainers may have positions other than illustrated, the retainers may be formed separately from other parts of the pan support, and the retainers may be movable, without departing from the scope of the present invention.

Figure 25:
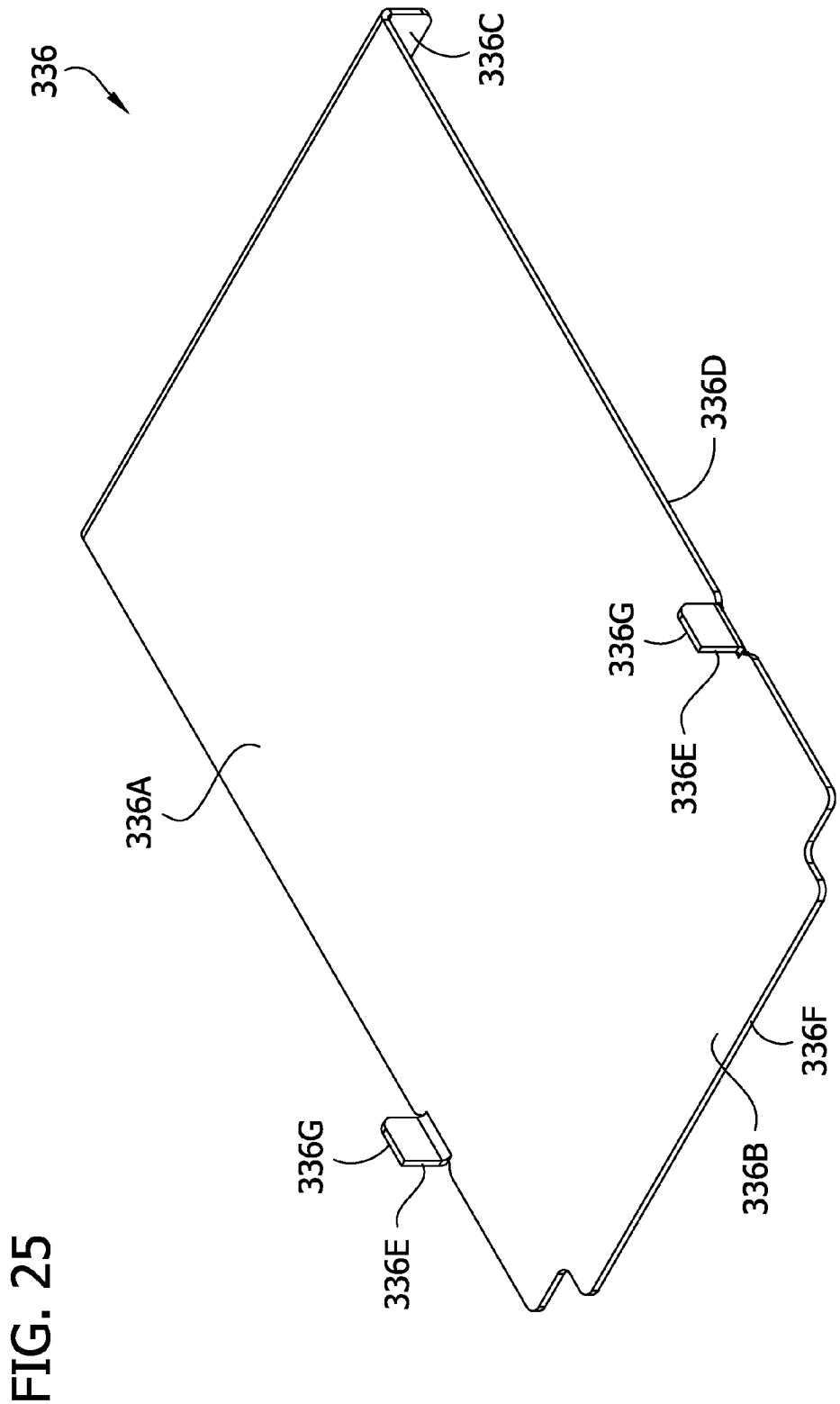
FIG. 25 is a front elevation of a cover of the pan storage module of FIG. 23.

As shown in FIG. 25, the cover 336 includes a pan covering section 336A having front and rear ends, a tongue 336B in front of and extending forward from the front end of the pan covering section, and a prop 336C behind and extending down from the rear end of the pan covering section. As will become apparent, the cover 336 is selectively receivable in and removable from the pan storage space 340 from the front opening. The cover 336 is constructed to permit the pan 338 to be slidably received under the cover in the pan storage space 340 and pushed into position below the cover in the pan storage space. For example, in the illustrated embodiment, the bottom side of the front end of the pan covering section 336A is generally smooth (e.g., without a downward lip or flange) for slidingly receiving the pan thereunder. The cover 336 may be formed of an acrylic material or any other suitable material, such as metal.

The pan covering section 336A includes a generally rectangular body having a width and a length both greater than a thickness of the rectangular body. The bottom of the pan covering section includes a generally rectangular pan rim engagement surface 336D constructed to engage the pan rim 338F around the periphery of the pan rim to cover the open top of the pan 338 and desirably substantially seal (e.g., by the force of gravity on the cover 336) around the open top of the pan. In the illustrated embodiment, the bottom of the pan covering section 336A (i.e., pan rim engagement surface) is substantially planar, but other configurations may be used without departing from the scope of the present invention.

Referring to FIGS. 25 and 26, the prop 336C in the illustrated embodiment comprises a downwardly turned flange extending along the entire width of the cover. The prop 336C includes an upper end connected to the pan covering section 336A and a lower end spaced from the upper end for engaging a support surface (e.g., slide surface 352 of the pan support 334) to prop the rear end of the pan covering section 336A spaced above the support surface. The prop 336C may be used to support the rear end of the pan covering section 336A as the pan 338 is slid into the pan storage space 340. Desirably, for reasons explained below, the prop 336C supports the rear end of the pan covering section 336A higher than the front end of the pan covering section when the cover 336 is in the pan storage space 340 and the pan is not in the pan storage space. Desirably, the prop has a height about the same as but less than a height of the rim, as with the embodiment described above with respect to FIG. 13. Props having other configurations may be used, or the prop may be omitted, without departing from the scope of the present invention. It will be appreciated that, if one or more props are used, it is desirable to provide the props on a rear half (e.g., rearward of a midline of the pan covering section 336A) of the cover, as is the prop 336C, for propping up the rear end of the pan covering section 336A.

Referring to FIG. 25, the tongue 336B is positioned at the front end of the cover and extends between the left and right sides of the cover. The cover 336 includes ears (broadly "protrusions") 336G on opposite left and right sides of and extending upward from the pan covering section 336A. The ears 336G include forward facing retainer engagement surfaces 336E constructed to engage the cover engagement surfaces 356 of the retainers 354 to retain the cover 336 in the pan storage space 340 when the pan 338 is received in the pan storage space under the cover. The engagement of the retainer engagement surfaces 336E with the retainers 354 maintains the cover 336 in the pan storage space 340 when the pan 338 is slid partially out of the pan storage space from the front opening. As explained in further detail below, when the pan 338 is inserted into the pan storage space, the cover 336 is moved upward such that the ears 336G and thus the retainer engagement surfaces 336E are positioned with respect to the retainers 354 for retaining the cover in the pan storage space. More specifically, the ears 336G rise into the openings 354 so the retainer engagement surfaces 336E are in blocking register with the cover engagement surfaces 356 of the retainer so when the pan 338 is slid forward, engagement of the retainer engagement surfaces with the retainers limits forward travel of the cover. The ears 336G are provided on the front half of the cover 336 (e.g., forward of a midline of the pan covering section 336A). In the illustrated embodiment, the ears 336G are positioned such that the retainer engagement surfaces 336E are positioned rearward from the front edge of the cover. The retainer engagement surfaces 336E desirably have a height ranging from about ¾ inch to about 1.5 inches for providing sufficient tolerance for the cover 336 to move up and down while still being retained in the pan storage space. In the illustrated embodiment, the retainer engagement surfaces 336E are about 1 inch tall. Other configurations and types of tongues and retainers may be used without departing from the scope of the present invention. For example, the tongue may be omitted. Moreover, other configurations and/or numbers of retainer engagement surfaces (e.g., one, three, four, etc.) may be used, and the retainer engagement surfaces may be provided at other locations, without departing from the scope of the present invention. It will be appreciated that protrusions other than the illustrated ears extending upward can be used to provide a retainer engagement surface for retaining the cover in the pan storage space.

An example method of manipulating the pan storage module 328 will now be described with reference to FIGS. 26-29. FIG. 26 illustrates the cover 336 received in the pan storage space 340 in the pan support 334. The cover 336 has been inserted into the pan storage space 340 from the front opening. The prop 336C engages the rear ends of the slide surfaces 352 and supports the rear end of the pan covering section 336A higher than the front end of the pan covering section. The front end of the cover 336 is supported on the front end of the slide surfaces 352, and more specifically the bottom of the front end of the cover 336 to the right and left sides of the tongue 336B rests on the slide surfaces 352.

Figure 27:
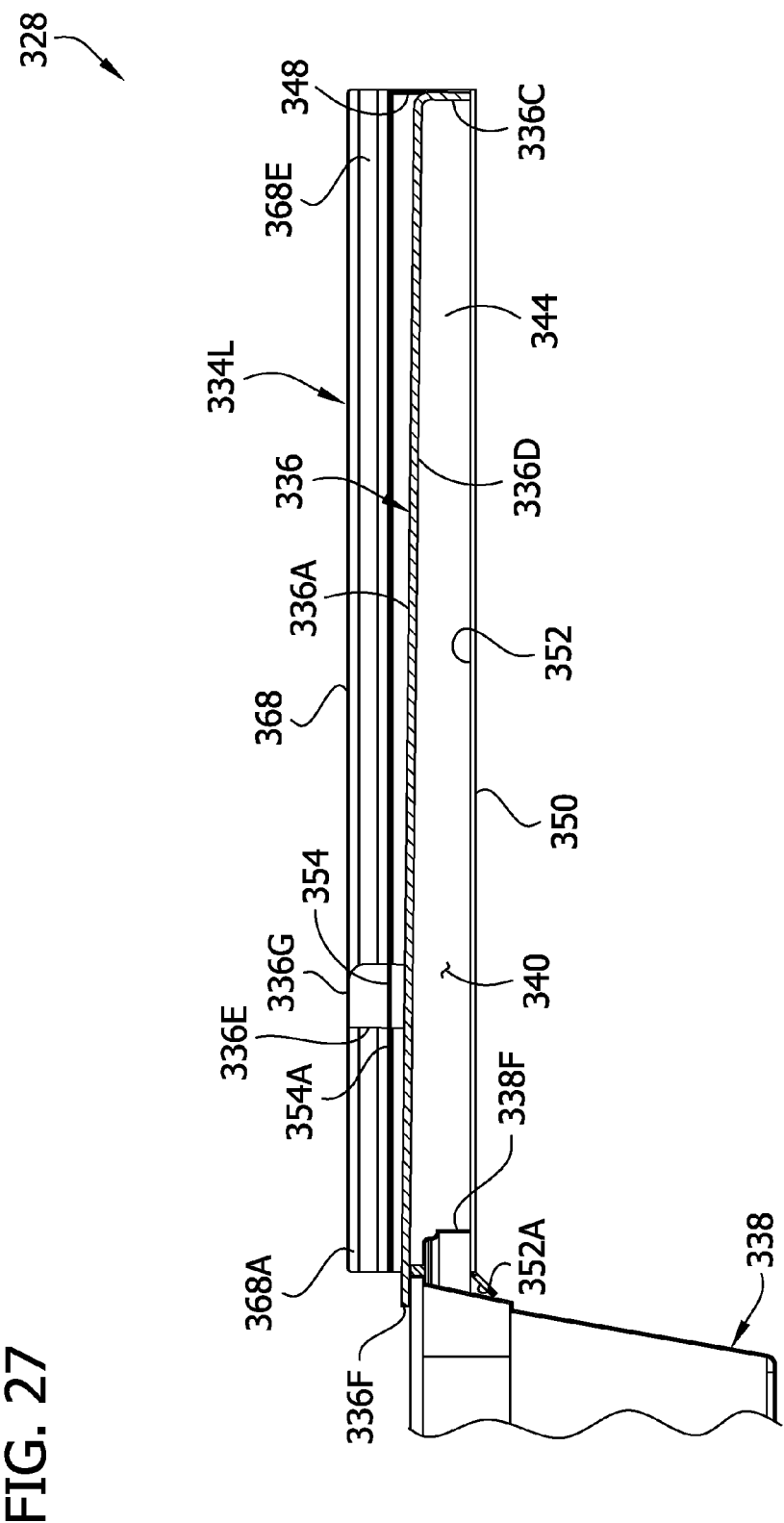

Referring to FIG. 27, the pan 338 (e.g., including food or other contents therein) may be used to lift the front end of the cover 336 so the pan can be slid into the pan storage space 340 under the cover. The ramps 352A facilitate this positioning of the pan 338 below the front end of the cover 336 and onto the front ends of the slide surfaces 352. The front end of the cover 336 (e.g., the tongue 336B) may be constructed to facilitate lifting the front end of the cover to permit insertion of the pan 338 below the cover 336. Lifting of the cover 336 upward moves the ears 336G upward into or farther into the openings 354 for positioning the retainer engagement surfaces 336E in retaining registration with respect to the cover engagement surfaces 356 for retaining the cover in the pan storage space. The front end of the cover 336 includes a front edge 336F defined in the illustrated embodiment by the tongue 336B. The front edge 336F is positioned forward from the left and right retainer engagement surfaces 336E. When the cover 336 is received in the pan storage space 340, the tongue 336B extends out of the front opening, and the front edge 336F of the cover is positioned forward from the front opening outside the pan storage space. Moreover, the front edge 336F of the cover 336 is positioned forward from the front ends of the slide surfaces 352 so a bottom of the front edge is accessible in front of the slide surfaces for lifting the front end with the pan 338, as shown in FIG. 27. Other configurations may be used without departing from the scope of the present invention. For example, the front of the cover may not include a tongue, and the front edge of the cover may not be positioned outside the pan storage space or forward from the retainers when the cover is received in the pan storage space.

It will be appreciated that in other configurations, such as where the front ends of the slide surfaces terminate short of the retainers and the cover does not extend forward of the retainers, the bottom of the front end of the cover could still be accessed for lifting the cover to permit insertion of the pan under the cover in the pan storage space.

Figure 28:
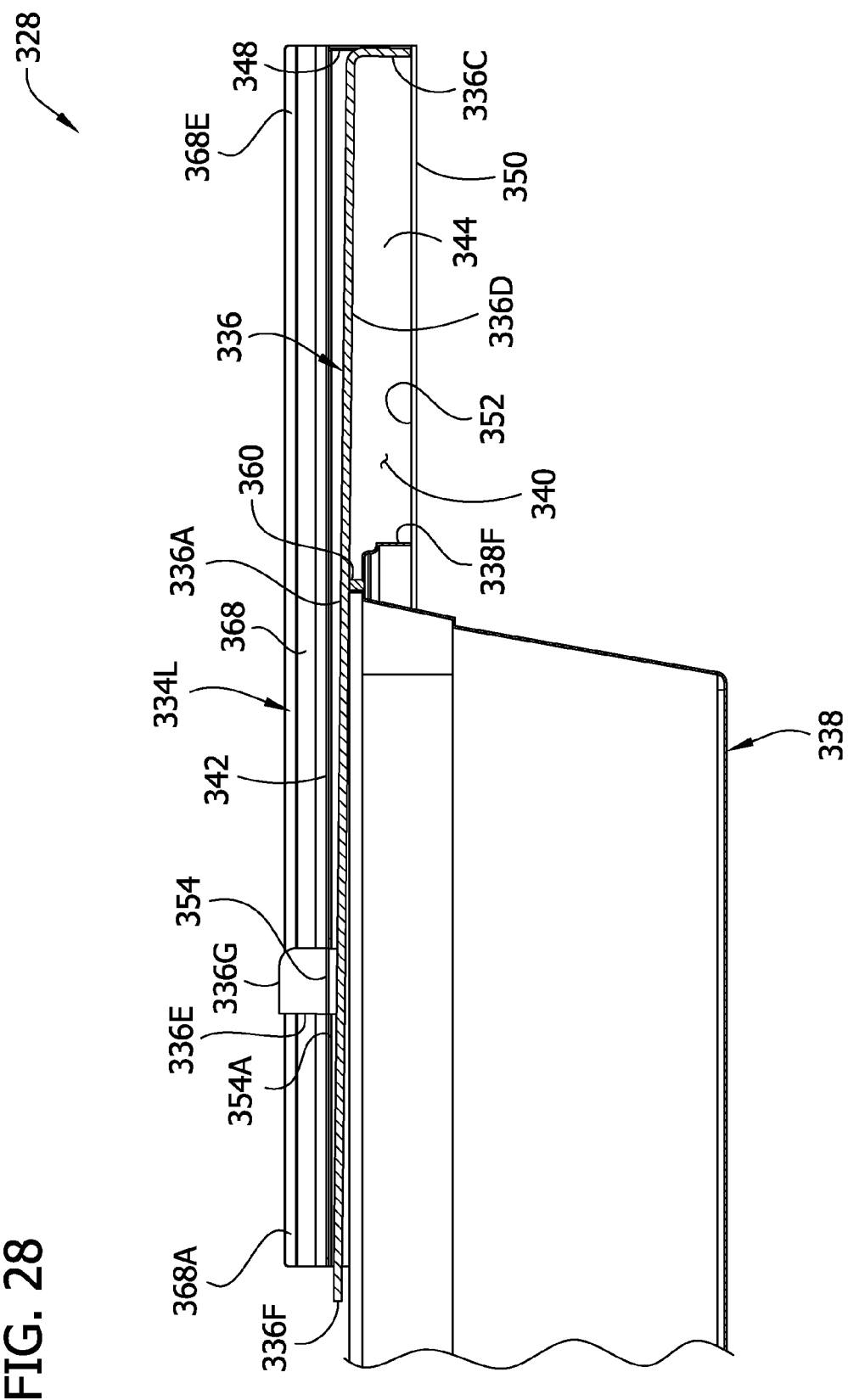
Figure 29:
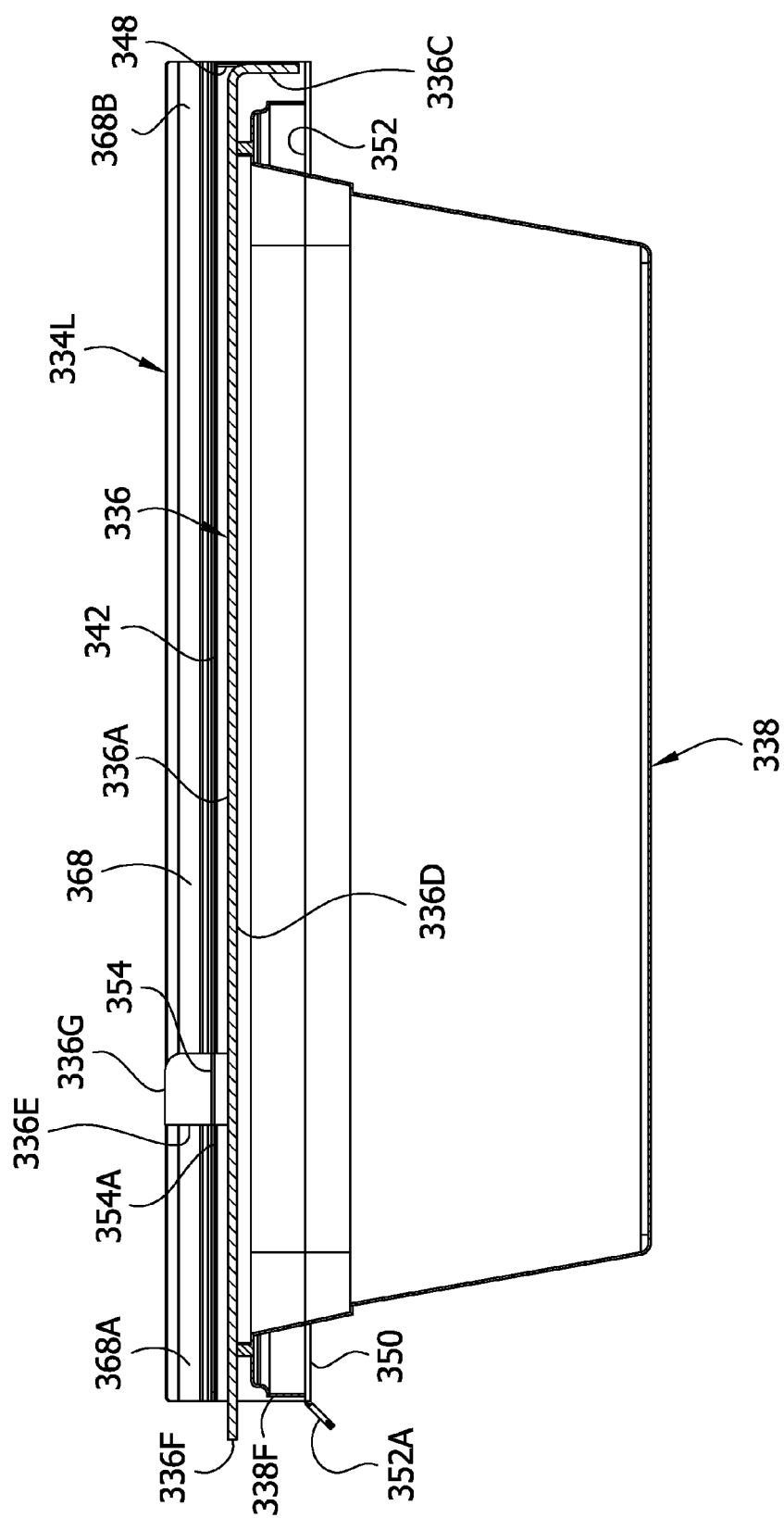
Figure 30:
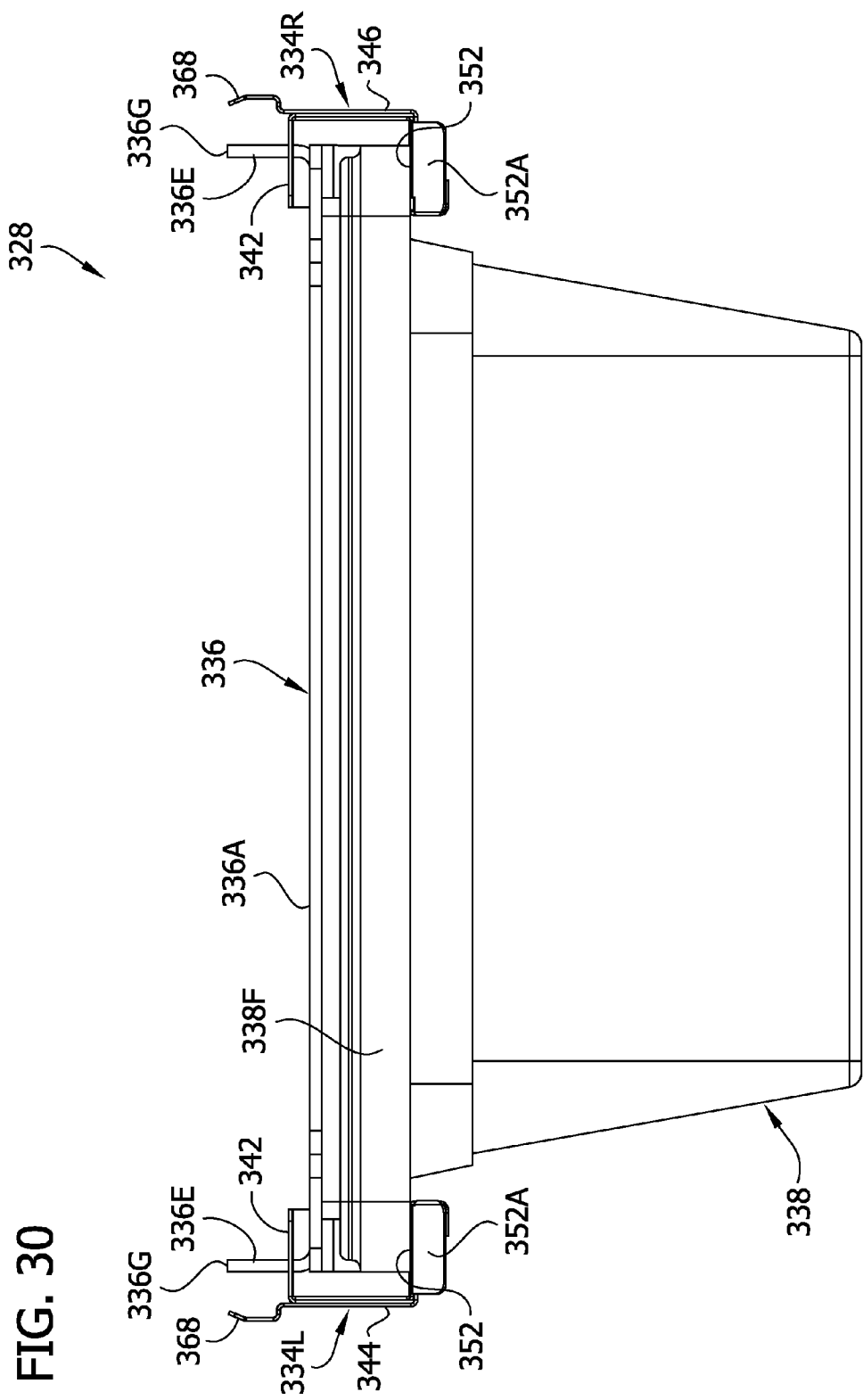
FIG. 30 is a front elevation of the pan storage module having the pan stored therein.

After the front end of cover 336 has been lifted, the pan can be slid into the pan storage space 340 by slidably engaging and supporting the left and right portions of the rim 338F with the left and right slide surfaces 352. Referring to FIGS. 27 and 28, when the user begins to slide the pan 338 into the pan storage space 340 along the slide surfaces 352, the front end of the pan covering section 336A is supported by the pan slightly higher than the rear end of the pan covering section supported by the prop 336C. This is because the rim 338F is taller than the prop 336C. The difference in elevation of the front and rear ends of the pan covering section 336A provides the pan covering section with an inclined orientation in which the pan rim engagement surface 336D slopes upwardly from the rear end of the pan covering section to the front end of the pan covering section. As the rear end of the pan 338 advances into the pan storage space 340, the rear portion of the rim 338F slides along the bottom of the pan covering section 336A, and the stops 348 of the pan support 334 prevent the cover 336 from moving rearward. Because the rear end of the pan covering section 336A is propped up by the prop 336C, the rear portion of the rim 338F slides with less friction along the bottom of the pan covering section, which makes it easier for a user to push the pan 338 into the pan storage space 340. The engagement of the rear portion of the rim 338F with the bottom of the pan covering section 336A defines a moving balance point 360 (FIG. 28) of the cover 336. As the rear portion of the rim 338F and thus the balance point 360 move rearwardly in the pan storage space 340, the weight of the cover 336 in front of the balance point eventually overcomes the weight of the cover behind the balance point, at which time the prop 336C is lifted off the slide surfaces 352 (broadly "support surface") and the pan covering section 336A changes from its inclined orientation to a generally horizontal orientation in which the pan rim engagement surface 336D engages more of the rim 338F than just the rear rim portion and in a generally flatwise manner. As shown in FIGS. 29 and 30, after the pan 338 is pushed fully into the pan storage space 340 into a stowed position, the pan rim engagement surface 336D engages substantially all of the rim 338F, and the pan covering section 336A covers the open top of the pan. As shown in FIG. 29, because the prop 336C has a height shorter than the height of the rear portion of the rim 338F, in the stowed position the prop is not in engagement with the slide surfaces 352 and does not support the rear end of the pan covering section 336A. The shorter height of the prop 336C permits the bottom of the rear end of the pan covering section 336A to rest on the pan 338 to close the rear end of the open top. Desirably, in the stowed position of the pan 338, the pan by itself supports substantially the full weight of the cover 336 so the force of gravity on the cover causes the pan rim engagement surface 336D of the cover to engage and substantially seal around the open top. It will be understood the seal may not be fluid tight but at least provides a substantial barrier that assists in preventing gas flow through the open top.

When it is desired to remove food or other contents from the stowed pan 338, the pan may be slid partially out of the pan storage space 340 from the front opening. As shown in FIG. 29, when the pan 338 is under the cover 336 in the pan storage space 340, the front end of the cover is supported by the pan in a position in which the retainer engagement surfaces 336E are in retaining registration with the retainers 354 (e.g., blocked by the retainers for limiting forward movement). Accordingly, as the pan 338 is slid forward out of the pan storage space 340, the cover 336 is retained in the pan storage space by the retainers 354. The user can move the pan 338 like a drawer partially out of and back into the pan storage space 340 to remove or place food or other contents in the pan. If the user does not pull the pan 338 entirely off the slide surfaces 352, the pan will remain at least partially supported by the slide surfaces, and the cover 336 will remain in retaining registration with the retainers 54. For example, FIG. 28 shows the pan 338 in a position which may be described as partially pulled out of the pan storage space 340. As the pan 338 is pulled out of the pan storage space 340, the open top of the pan becomes uncovered, permitting the user to access the contents in the pan. It will be appreciated that this arrangement enables manipulation of the pan 338 and uncovering of the pan all with one hand, and the contents can be removed from the pan with the other hand of the user.

If the user desires to remove the pan 338 or cover 336 from the pan storage space 340, they can do so by pulling the pan off the slide surfaces 352 out of the front opening and optionally then removing the cover from the pan storage space. For example, the user may wish to refill the pan 338 with new contents, to clean the pan or cover 336, or to discard and replace the pan or cover. When the pan 338 is removed from the pan storage space 340, the ears 336G of the cover 336 and more specifically the retainer engagement surfaces 336E fall downward with respect to the retainers 354 (e.g., fall below the cover engagement surfaces 356), and the cover comes to rest in the position shown in FIG. 26, in which the retainer engagement surfaces 336E are out of retaining registration with the retainers. The ears 336G are free of a catch for holding the ears 336 in retaining registration with the retainers 354 without the pan 338 at least partially supporting the cover. The pan support 334 and cover 336 are constructed to permit the retainer engagement surfaces 336E of the cover to fall downward out of retaining registration with the retainers 354 (e.g., become unblocked by the retainers) without the retainers being moved when the pan 338 is removed from the pan storage space 340. For example, the retainer engagement surfaces 356 can fall downward out of retaining registration with respect to the retainers 354 by falling below the retainers 354, or falling downward sufficiently such that the cover can be moved forward out of the front opening, as the front end of the cover is permitted to slide downward over the front ends of the slide surfaces 356, such that the retainer engagement surfaces 356 can pass the cover engagement surfaces of the retainers. Accordingly, after the pan 338 is removed from the pan storage space 340, the cover 336 is removable from the pan storage space from the front opening without requiring movement of the cover engagement surfaces 356 of the retainers 354.

It will be appreciated that the configuration above provides several benefits. Pan storage systems constructed according to the present invention can be arranged such that a person can hold the pan 338, lift the front end of the cover 336, and slide the pan into the pan storage space 340 to be covered by the cover, all with one hand. Moreover, the cover 336 is easily removable from the pan storage space without requiring movement or actuation of the retainers 354. The configuration enhances ease of use and increases work efficiency. However, it will be appreciated more than one hand may be used, and movable retainers may be used, without departing from the scope of the present invention.

Referring again to FIG. 31, in another aspect of the present invention, the pan storage modules 328 may be selectively and releasably mountable on the frame 330 at various positions. In the illustrated embodiment, five modular pan supports 328 are shown mounted on the frame 330 at different elevations. In this particular example, the user selected to mount on the frame three pan storage modules 328 for relatively shallow pans at lower elevations and two pan storage modules 328 for relatively deeper pans at higher elevations. Other arrangements can be used without departing from the scope of the present invention. For example, the modular pan support system 326 may include fewer (e.g., one) or more pan storage modules, and the pan storage modules can be mounted in other arrangements.

Figure 31:
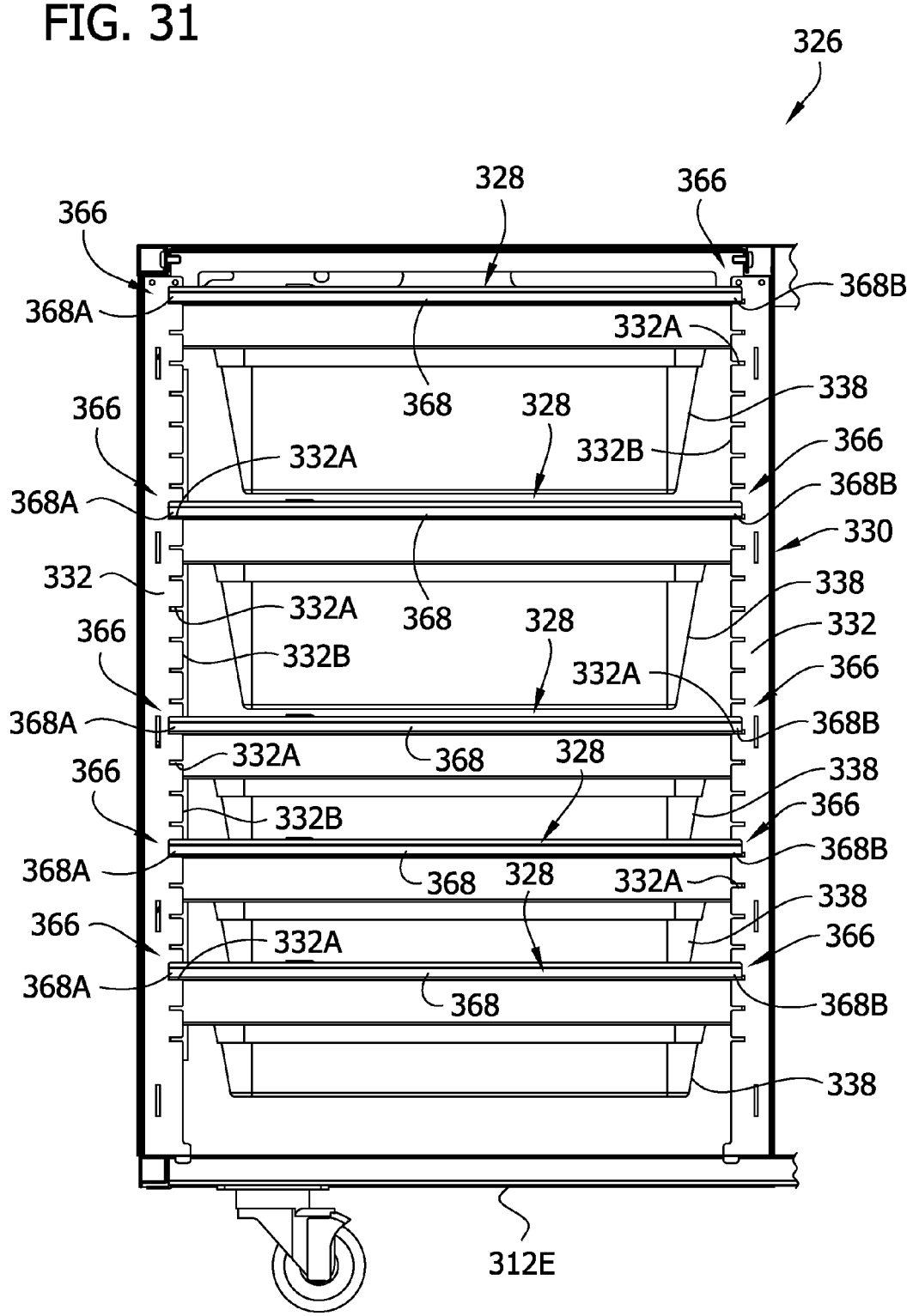
FIG. 31 is a section of a portion of the lower portion of the pan storage unit shown in FIG. 22 showing releasable mounting connections of the pan storage modules with a frame of the pan storage unit.

As shown in FIG. 31, the modular pan support system 326 includes a plurality of releasable mounting connections 366 for selectively mounting the pan storage modules 328 on the frame 330. Each pan storage module 328 includes a plurality of first elements of the releasable mounting connections 366, the frame 330 includes a plurality of second elements of the releasable mounting connections, and the first and second elements are configured to be engaged or interfaced with each other to releasably mount the pan storage modules on the frame.

Figure 32:
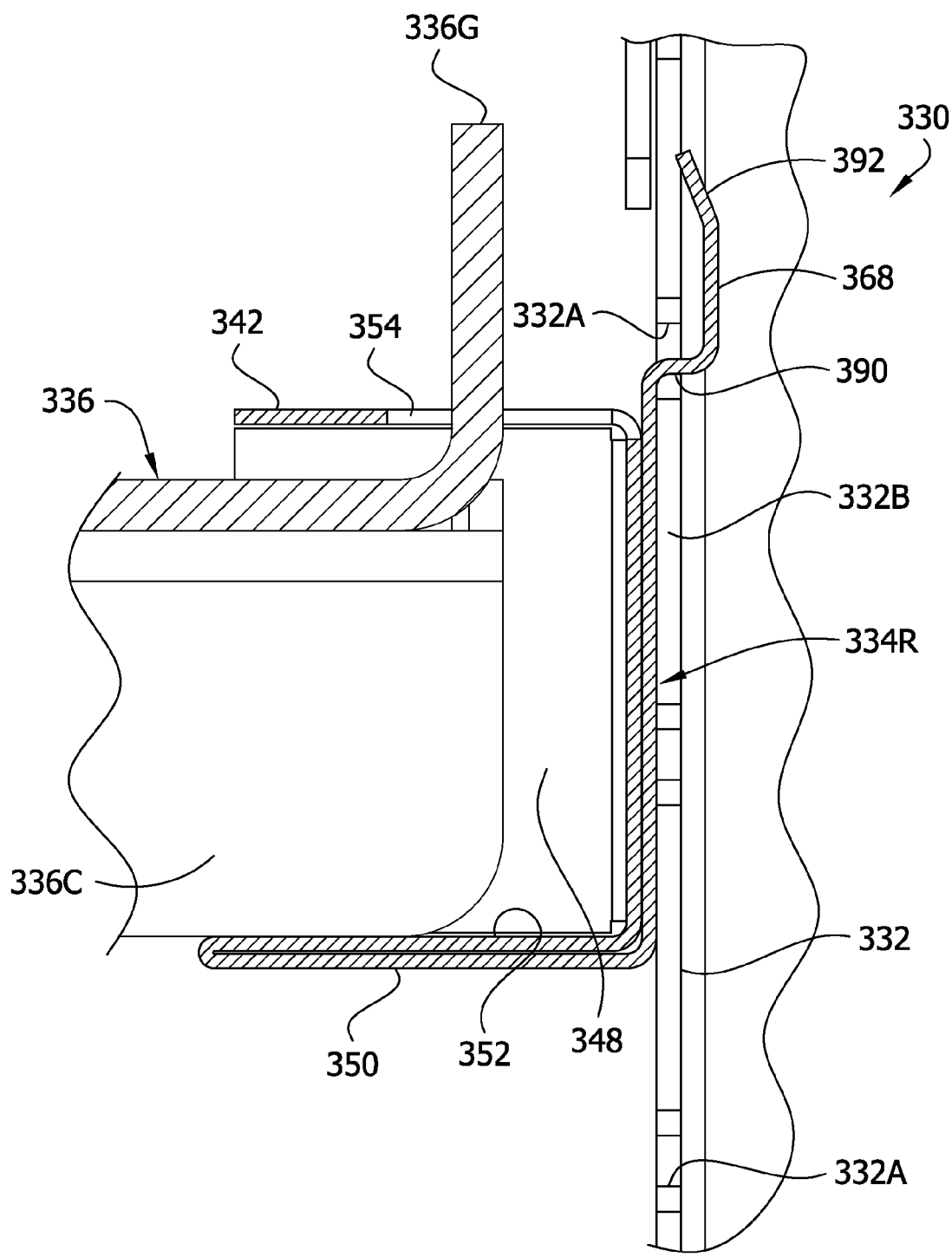
FIG. 32 is a section of a portion of the frame and a portion of a pan support module illustrating details of a releasable mounting connection for mounting the pan storage module on the frame.

As shown in FIGS. 24 and 30-32, in the illustrated embodiment, the pan storage modules 328 include first elements 368A, 368B in the form of portions of wings (broadly "protrusions") 368. Although the front and rear wing portions 368A, 368B are shown as parts of a common wing 368, it will be appreciated that the front and rear portions of the wings can be separate from each other without departing from the scope of the present invention. The wings extend laterally and upward from the side walls of the left and right sides of the pan support. As shown in FIG. 32, the wing portions 368A, 368B include, in the installed orientation, a generally horizontal bearing section 390, and a generally upstanding brace section 392.

Referring to FIG. 31, the right side of the frame 330 includes front and rear racks 332 each including a plurality of openings 332A (broadly "second elements" of the releasable mounting connections 366) in the form of slots having an open end and a closed end. The slots 332A are sized for receiving the respective front and rear wing portions 368A, 368B for mating engagement with the wing portions and are spaced from one another at intervals along the height of the racks 332. The racks 332 have teeth 332B separating the openings from one another. Although not shown, it will be understood the left front and rear racks 332 of the left compartment (and the racks of the middle compartment) have the same configuration as the right front and rear racks 332 shown in FIG. 31. The open ends of the slots 332A on the front racks 332 face rearward, and the open ends of the slots on the rear racks face forward. The arrangement is such that the racks 332 define a plurality of elevations at which the pan storage modules 328 can be releasably mounted. The wing portions 368A, 368B of a pan storage module 328 are receivable in slots 332A of the racks 332 at a common elevation for mounting the pan storage module 328 on the frame 330 in a generally horizontal orientation. For example, a pan storage module 328 can be releasably mounted on the frame 330 by mounting the left and right pan support sides 334L, 334R on the frame at common elevations. For example, for installing the frame support right side 334R, the tops of the wing portions 368A, 368B are pointed toward and aligned with selected slots 332A, the wing portions are inserted in the slots, and the pan support side is rotated in a counterclockwise direction such that the brace sections 392 of the wing portions rest against the outside of the rack 332 and the bearing sections 390 of the wing portions bear against bottoms of the slots, as shown in FIG. 32. The pan support left side 334L can be installed in a similar fashion to complete installation of the pan support, and the pan supports can be removed from the frame 330 by reversing the installation process.

It will be understood that other releasable mounting connections, fewer or more releasable mounting connections, and other arrangements of mounting connections, can be used without departing from the scope of the present invention. For example, the elements of the releasable mounting connections on the frame and pan storage module can be swapped. In other words, for example, the protrusions 368A, 368B could be provided on the frame 330, and the openings 332A could be provided on the pan storage modules 328, or some of each of the protrusions and openings may be provided on the frame and the pan storage modules. In addition, other types of first and second elements, such as clips, clamps, teeth, cams, ribs, flanges, other mating elements, etc. could be used without departing from the scope of the present invention. Moreover, the releasable mounting connections may be omitted without departing from the scope of the present invention. In other words, the pan storage module may stand alone or may be mounted to the frame in a non-releasable fashion.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawing[s] shall be interpreted as illustrative and not in a limiting sense.

What is claimed is:

1. A pan support system for supporting at least one open top pan having a rim adjacent the open top, the system comprising
    a pan support having left and right sides, a pan storage space between the left and right sides sized for receiving at least a portion of the pan, and a front opening sized to permit the at least one pan to be inserted in the pan storage space from the front opening, the pan support including left and right slide surfaces constructed for slidably receiving and supporting respective left and right rim portions of the pan in the pan storage space, the pan support being free of support structure positioned to engage a bottom of the pan for supporting the bottom of the pan in the pan storage space,
    a cover for covering the open top of the pan, the cover having a front end, a rear end, and left and right sides, the cover being selectively receivable in and removable from the pan storage space from the front opening, the cover being constructed to permit the pan to be slidably received under the cover in the pan storage space, the cover being constructed to rest on a portion of the pan rim on a forward half of the pan and rest on another portion of the pan rim on a rearward half of the pan,
    wherein the pan support includes at least one retainer constructed for retaining the cover in the pan storage space,
    wherein the cover includes at least one retainer engagement surface constructed to engage the at least one retainer to retain the cover in the pan storage space when the cover is in the pan storage space with the pan; and
    wherein at least one of the following:
        a) the cover includes a main body and at least one protrusion extending upward and having the at least one retainer engagement surface, the cover being removable from the pan storage space without moving the retainer engagement surface with respect to the main body;
        b) the cover includes a pan covering section for covering the open top of the pan, the pan covering section including a front end and a rear end, the cover including a prop extending downward on a rear half of the cover, the prop being constructed for supporting the rear end of the pan covering section higher than the front end of the pan covering section when the cover is in the pan storage space without the pan;
        c) the left and right slide surfaces and the cover are configured such that the cover rests on the left and right slide surfaces adjacent the front end of the cover when the cover is received in the pan storage space without the pan; or
        d) the pan is configured to maintain a horizontal orientation when sliding on the left and right slide surfaces, the cover has a midpoint halfway between the front and rear ends of the cover, and the pan support is configured to contact to vertically support a rearward portion of the pan rearward from the midpoint of the cover when the cover and pan are received in the pan storage space.

2. A pan support system as set forth in claim 1 wherein the cover includes the main body and the at least one protrusion extending upward and having the at least one retainer engagement surface, the cover being removable from the pan storage space without moving the retainer engagement surface with respect to the main body.

3. A pan support system as set forth in claim 2 wherein the at least one retainer comprises at least one opening constructed for receiving the at least one protrusion for retaining the cover in the pan storage space.

4. A pan support system as set forth in claim 1 wherein the pan support includes at least one stop at a rear end of the pan storage space for preventing the pan from exiting the rear of the pan storage space.

5. A pan support system as set forth in claim 1 wherein the at least one retainer is fixed in position on the pan support.

6. A pan support system as set forth in claim 1 wherein the cover and pan support are configured such that the cover rests on at least one of the left and right slide surfaces when the cover is in the pan storage space without the pan, and the cover is spaced above the at least one of the left and right slide surfaces when the cover is in the pan storage space covering the open top of the pan.

7. A pan support system as set forth in claim 1 wherein the cover includes the pan covering section for covering the open top of the pan, the pan covering section including the front end and the rear end, the cover including the prop extending downward on the rear half of the cover, the prop being constructed for supporting the rear end of the pan covering section higher than the front end of the pan covering section when the cover is in the pan storage space without the pan.

8. A pan support system as set forth in claim 1 wherein the cover and pan support are configured to require removal of the pan from the pan storage space before permitting removal of the cover from the pan storage space.

9. A pan support system as set forth in claim 1 wherein the cover includes a bottom surface, and the retainer engagement surface is immovable with respect to the bottom surface.

10. A pan support system as set forth in claim 1 wherein the left and right slide surfaces and the cover are configured such that the cover rests on the left and right slide surfaces adjacent the front end of the cover when the cover is received in the pan storage space without the pan.

11. A pan support system as set forth in claim 1 wherein the pan is configured to maintain the horizontal orientation when sliding on the left and right slide surfaces, the cover has the midpoint halfway between the front and rear ends of the cover, and the pan support is configured to contact to vertically support the rearward portion of the pan rearward from the midpoint of the cover when the cover and pan are received in the pan storage space.

12. Apparatus for supporting an open top pan, the apparatus comprising,
a pan support having left and right sides, a pan storage space between the left and right sides sized to receive at least a portion of the pan, and a front opening sized to permit the pan to be inserted in the pan storage space from the front opening, the pan support including at least one slide surface in the pan storage space constructed to slidably receive and support the pan on the at least one slide surface,
a cover for covering the open top of the pan, the cover having a front end, a rear end, and left and right sides, the cover being selectively receivable in and removable from the pan storage space from the front opening, the cover being constructed to permit the pan to be slidably received under the cover in the pan storage space,
the pan support including at least one retainer for retaining the cover in the pan storage space, the retainer being constructed to permit the pan to be slidably received on the at least one slide surface in the pan storage space from the front opening below the retainer,
the cover including at least one retainer engagement surface constructed to be in retaining registration with the at least one retainer to retain the cover in the pan storage space when the cover is in the pan storage space with the pan, and
the pan support being constructed such that, when the pan is removed from the pan storage space from under the cover, the at least one retainer engagement surface falls downward by gravity and rests out of retaining registration with the at least one retainer without the at least one retainer being moved to permit removal of the cover from the pan storage space through the front opening.

13. Apparatus as set forth in claim 12 wherein the at least one retainer is fixed in position on the pan support.

14. Apparatus as set forth in claim 12 wherein the at least one retainer comprises an opening constructed for receiving a portion of the cover including the at least one retainer engagement surface.

15. Apparatus as set forth in claim 14 wherein the at least one retainer comprises at least two retainers, the at least two retainers comprising respective openings, the at least one retainer engagement surface comprises at least two retainer engagement surfaces corresponding to respective openings, and the cover includes at least two protrusions extending upward and having the respective retainer engagement surfaces, the protrusions being receivable in the respective openings for retaining the cover in the pan storage space.

16. Apparatus as set forth in claim 12 wherein the cover includes a pan covering section and a prop, the prop being positioned on a rear half of the cover and being constructed for supporting a rear end of the pan covering section higher than a front end of the pan covering section when the pan is not in the pan storage space.

17. Apparatus as set forth in claim 12 wherein the front end of the cover includes a front edge positioned forward from the at least one retainer engagement surface.

18. Apparatus as set forth in claim 12 wherein the at least one slide surface is constructed and positioned for slidably receiving and supporting a rim of the pan adjacent the open top of the pan.

19. Apparatus as set forth in claim 12 wherein the at least one slide surface and the cover are configured such that the cover rests on the at least one slide surface adjacent the front end of the cover when the cover is in the pan storage space without the pan.

20. Apparatus as set forth in claim 12 further comprising at least one pan support module, the at least one pan support module including said pan support and said cover, the at least one pan support module including at least two first mounting elements for selectively forming respective releasable mounting connections, the at least two first mounting elements including a left first mounting element positioned on the left side of the pan support and a right first mounting element positioned on the right side of the pan support; and
a frame including a plurality of second mounting elements for selectively forming the releasable mounting connections with the at least two first mounting elements of the pan support module, the plurality of second mounting elements including multiple sets of at least two second mounting elements, the sets of at least two second mounting elements being positioned at different elevations on the frame, wherein the at least two first mounting elements of the pan support module are selectively engageable with a selected set of the second mounting elements of the frame for forming respective releasable mounting connections for mounting the pan support module at a selected elevation on the frame.

21. Apparatus as set forth in claim 20 wherein the left and right sides of the pan support are separate pieces selectively positionable with respect to each other and independently mountable on the frame.

22. A pan support system for supporting at least one open top pan having a rim adjacent the open top, the system comprising
a pan support having left and right sides, a pan storage space between the left and right sides sized for receiving at least a portion of the pan, and a front opening sized to permit the at least one pan to be inserted in the pan storage space from the front opening, the pan support including left and right slide surfaces constructed for slidably receiving and supporting respective left and right rim portions of the pan in the pan storage space, the pan support being free of support structure positioned to engage a bottom of the pan for supporting the bottom of the pan in the pan storage space, a cover for covering the open top of the pan, the cover having a front end, a rear end, and left and right sides, the cover being selectively receivable in and removable from the pan storage space from the front opening, the cover being constructed to permit the pan to be slidably received under the cover in the pan storage space, wherein the pan support includes at least one retainer constructed for retaining the cover in the pan storage space, wherein the cover includes at least one retainer engagement surface constructed to engage the at least one retainer to retain the cover in the pan storage space when the cover is in the pan storage space with the pan; and wherein at least one of the following:
  a) the cover and pan support are configured such that the cover rests out of retaining registration with the at least one retainer when the cover is in the pan storage space without the pan, and the cover is movable into retaining registration with the at least one retainer by sliding the pan into the pan storage space along the left and right slide surfaces under the cover; or
  b) the pan support system further comprises at least one pan support module and a frame, the at least one pan support module including said pan support and said cover, the at least one pan support module including at least two first mounting elements for selectively forming respective releasable mounting connections, the at least two first mounting elements including a left first mounting element positioned on the left side of the pan support and a right first mounting element positioned on the right side of the pan support, the frame including a plurality of second mounting elements for selectively forming the releasable mounting connections with the at least two first mounting elements of the pan support module, the plurality of second mounting elements including multiple sets of at least two second mounting elements, the sets of at least two second mounting elements being positioned at different elevations on the frame, the at least two first mounting elements of the pan support module being selectively engageable with a selected set of the second mounting elements of the frame for forming respective releasable mounting connections for mounting the pan support module at a selected elevation on the frame.

23. A pan support system as set forth in claim 22 wherein the cover and pan support are configured such that the cover rests out of retaining registration with the at least one retainer when the cover is in the pan storage space without the pan, and the cover is movable into retaining registration with the at least one retainer by sliding the pan into the pan storage space along the left and right slide surfaces under the cover.

24. A pan support system as set forth in claim 22 wherein the pan support system further comprises the at least one pan support module and the frame, the at least one pan support module including said pan support and said cover, the at least one pan support module including the at least two first mounting elements for selectively forming respective releasable mounting connections, the at least two first mounting elements including the left first mounting element positioned on the left side of the pan support and the right first mounting element positioned on the right side of the pan support, the frame including the plurality of second mounting elements for selectively forming the releasable mounting connections with the at least two first mounting elements of the pan support module, the plurality of second mounting elements including the multiple sets of at least two second mounting elements, the sets of at least two second mounting elements being positioned at different elevations on the frame, the at least two first mounting elements of the pan support module being selectively engageable with a selected set of the second mounting elements of the frame for forming respective releasable mounting connections for mounting the pan support module at a selected elevation on the frame.

25. A pan support system as set forth in claim 24 wherein the left and right sides of the pan support are separate pieces selectively positionable with respect to each other and independently mountable on the frame.

* * * * *